(12) United States Patent
McCrae et al.

(10) Patent No.: US 10,867,435 B2
(45) Date of Patent: Dec. 15, 2020

(54) SYSTEM AND METHOD FOR GENERATING PLANAR SECTION 3D SHAPE REPRESENTATIONS

(71) Applicant: FLATFAB INC., Toronto (CA)

(72) Inventors: James McCrae, Brampton (CA); Karan Singh, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 89 days.

(21) Appl. No.: 16/284,303

(22) Filed: Feb. 25, 2019

(65) Prior Publication Data

US 2020/0058160 A1 Feb. 20, 2020

Related U.S. Application Data

(63) Continuation of application No. 14/496,672, filed on Sep. 25, 2014, now Pat. No. 10,262,457.

(51) Int. Cl.
| | | |
|---|---|---|
| *G06T 17/00* | (2006.01) | |
| *G06F 3/0481* | (2013.01) | |
| *G06F 3/0484* | (2013.01) | |
| *G06T 19/00* | (2011.01) | |
| *G06F 3/0488* | (2013.01) | |

(52) U.S. Cl.
CPC .......... *G06T 17/00* (2013.01); *G06F 3/04815* (2013.01); *G06F 3/04845* (2013.01); *G06F 3/04847* (2013.01); *G06T 19/00* (2013.01); *G06F 3/0488* (2013.01); *G06T 2219/008* (2013.01)

(58) Field of Classification Search
CPC ... G06T 17/00; G06T 19/00; G06T 2219/008; G06F 3/04815; G06F 3/04845; G06F 3/04847; G06F 3/0488
USPC .......................................................... 703/1
See application file for complete search history.

(56) References Cited

PUBLICATIONS

Saul et al. "SketchChair: An All-in-one Chair Design System for End Users", ACM TEI '11, Jan. 2011, pp. 73-80. (Year: 2011).*
MCCrae et al. "Slices: A Shape-proxy Based on Planar Sections", Dec. 2011, ACM Transactions on Graphics, vol. 30, No. 6, 11 pages. (Year: 2011).*
McCrae, James. "Planar Section Representation of 3D Shape", 2014, 180 pages. (Year: 2014).*
Nobuyuki Umetani and Ryan Schmidt. Cross-sectional structural analysis for 3d printing optimization. In SIGGRAPH Asia 2013 Technical Briefs, SA '13, pp. 5:1-5:4, New York, NY, USA, 2013. ACM.
Yuliy Schwartzburg, and Mark Pauly. Fabrication-aware Design with Intersecting Planar Pieces. Comput. Graph. Forum 32(2):317-326 (2013).
Yutaka Ohtake, Alexander Belyaev, and Hans-Peter Seidel. Ridge-valley lines on meshes via implicit surface fitting. In SIGGRAPH, pp. 609-612, 2004.

(Continued)

*Primary Examiner* — Suzanne Lo
(74) *Attorney, Agent, or Firm* — Bhole IP Law; Anil Bhole; Marc Lampert

(57) ABSTRACT

A system and method for creating, configuring, and visualizing 3D shape representations is provided. The system enables a user to create, interact with and visualize planar section representations. In further aspects, methods are provided for enabling modification suggestions for structural and/or fabrication improvement.

12 Claims, 33 Drawing Sheets

(56) References Cited

PUBLICATIONS

Office Action for U.S. Appl. No. 14/496,672; USPTO; dated Mar. 28, 2017.
Office Action for U.S. Appl. No. 14/496,672; USPTO; dated Nov. 30, 2017.
Willis et al. "Spatial Sketch: Bridging Between Movement & Fabrication" In Proc. TEI 2010, 2010, pp. 5-12.
Autodesk. AutoCAD 2013 User's Guide (online), Jan. 2012. Retrieved from the Internet, pp. 169-171.
Tinkercad 3D Design Blog, New feature: Smart duplicate (online), Aug. 8, 2012. Retrieved from the Internet.
SolidWorks, Structural Analysis (online), 2013. Retrieved from the Internet Archive: Wayback Machine.

* cited by examiner

2301

2302

SYSTEM AND METHOD FOR GENERATING PLANAR SECTION 3D SHAPE REPRESENTATIONS

TECHNICAL FIELD

The following relates generally to a system and method for generating planar section 3D shape representations. More particularly, the following relates to configuration, visualization and structure verification relating to generating planar section representations.

BACKGROUND

Artists have used assemblies of 3D planar sections for more than a century to express both realistic forms and abstract ideas. Evidence suggests that symbolic abstractions dominate a mental model of objects. Thus, across cultures, users both recognize shape proxies quickly and tend to communicate objects by drawing them as symbolic abstractions. Artists and sculptors have long explored minimalist shape proxies, including planar section representations, to highlight defining aspects of familiar objects, and examples of such representations may be found throughout the world.

Planar sections of 3D shapes, due to their ease of assembly from compactly manufactured and packed 2D sheets, are an exemplary platform to study the junction of design, manufacturing, and human perception. Conceptually, there are two sources from which a planar abstraction might be created. The first source is pre-existing geometry. The second source, an artist or designer's creative intent, remains mainly unaddressed in prior disclosures.

Mathematically, a planar section representation is a non-empty set of planar sections. A planar section is defined geometrically by a unique 3D-embedded plane and one or more closed boundary curves that lie on the plane. No curve self-intersects and there are no intersections between any two coplanar curves.

The creation of planar sections by slicing existing 3D objects has received much attention in both research and industry. Problematically, planar section contours do not often lie precisely on 3D models. Additionally, fluid interfaces for sketching such planar section assemblies from scratch or combined with slices of existing 3D objects are relatively unexplored. Interfaces for creating such assemblies have application outside their direct outcome of 3D planar section sculptures, as these planar structures can form scaffolds for digital modelling and armatures for instrumented animatronics.

With laser cutting machines and 3D printers becoming increasingly accessible, it is expected that a wider audience will seek to create their own objects and general research in the areas of interactive systems and geometric algorithms to aid object design in the field of computer graphics remains active. Thus, automation of complex operations is desirable.

SUMMARY

In one aspect, a system for generating one or more planar sections to represent a three dimensional model using a fluid stroke-based workflow is provided, the system comprising (a) a user interface unit configured to receive user input, the user interface unit further operable to detect a user input of a continuous stroke defined by a starting point and an ending point; and (b) a generating unit in communication with the user interface unit, the generating unit receiving the stroke and generating: (i) a planar section having a boundary surrounding the starting point and including the ending point; and (ii) in response to user input of a subsequent stroke, a subsequent planar section substantially orthogonal to the planar section and intersecting the planar section along the stroke.

In another aspect, a system for generating planar section representations of a three dimensional model is provided, the system comprising: (a) a user interface unit configured to enable a user to input a three dimensional model; and (b) a generating unit in communication with the user interface unit, the generating unit configured to: (i) determine a boundary of the three dimensional model; (ii) generate a plurality of planar sections each substantially orthogonal to their adjacent planar sections to approximate the boundary, the plurality of planar sections being selected in accordance with generation rules.

In yet another aspect, a system for generating planar section representations of a three dimensional model is provided, the representations including at least one generated planar section, the system comprising: (a) a user interface unit configured to receive from a user a command for a replication operation and an input planar section for the replication operation; and (b) a generation unit configured to generate one or more planar sections that are replications of the input planar section.

In a further aspect, a method for generating one or more planar sections to represent a three dimensional model using a fluid stroke-based workflow is provided, the method comprising: (a) receiving user input and detecting a user input of a continuous stroke defined by a starting point and an ending point; and (b) generating, by a generating unit comprising a processor: (i) a planar section having a boundary surrounding the starting point and including the ending point; and (ii) in response to user input of a subsequent stroke, a subsequent planar section substantially orthogonal to the planar section and intersecting the planar section along the stroke.

In a still further aspect, a method for generating planar section representations of a three dimensional model is provided, the method comprising: (a) enabling a user to input a three dimensional model; and (b) generating, by a generating unit comprising a processor: (i) a boundary of the three dimensional model; (ii) a plurality of planar sections each substantially orthogonal to their adjacent planar sections to approximate the boundary, the plurality of planar sections being selected in accordance with generation rules.

In yet a further aspect, a method for generating planar section representations of a three dimensional model is provided, the representations including at least one generated planar section, the method comprising: (a) receiving from a user a command for a replication operation and an input planar section for the replication operation; and (b) generating one or more planar sections that are replications of the input planar section.

DESCRIPTION OF THE DRAWINGS

The features of the invention will become more apparent in the following detailed description in which reference is made to the appended drawings wherein.

DETAILED DESCRIPTION

Figure 1:
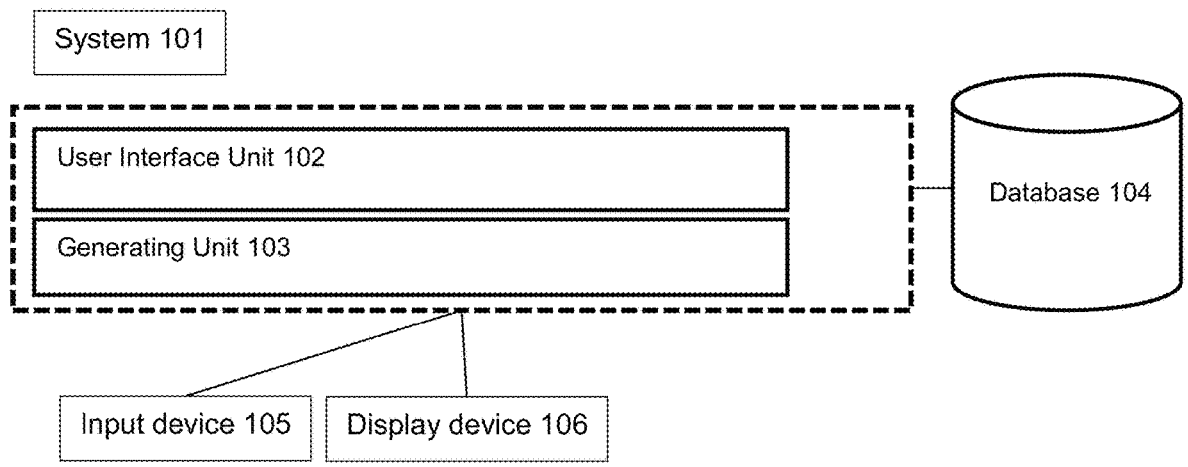
FIG. 1 is a block diagram of an example of a system for creating, configuring and visualizing shape representations.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It will also be appreciated that any engine, unit, module, component, server, computer, terminal or device exemplified herein that executes instructions may include or otherwise have access to computer readable media, such as, for example, storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as, for example, computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using one or more processors, computer readable media and computer readable/executable instructions that may be stored or otherwise held by such computer readable media and executed by the one or more processors.

The following provides a system and method for generating planar section 3D shape representations. Planar sections of 3D shapes, common in art and engineering, are an appealing shape abstraction, further popularized by their ease of manufacturing and assembly. The system and method described herein is adapted to address various design principles including those discovered by the applicants. These include insights in respect of how planar section assemblies are imagined and drawn.

The system enables both the importation by a user of an existing 3D shape and the generation of a corresponding set of planar section representations. The system further enables user-guided generation of planar section representations, which is hereinafter referred to as "creation". Further, creation can take place subsequent to importation. Both creation and importation are enabled by way of a user interface providing simplified creation and manipulation of planar section representations.

Without limiting the system and method described herein, exemplary users comprise designers, artists, architects, doctors, manufacturers, etc. In various embodiments, the 3D models generally relate to design of stable, connected, assemblable items for reproduction using 3D printing methods and/or manual fabrication. Further, planar structures may form scaffolds for digital modelling and instructions for instrumented animatronics. The system may enable users to create and save planar section representations and export them as OBJ (suitable for rendering), SVG (suitable for fabrication) formats or similar suitable formats.

The system may further provide for the creation of annotated models. For example, one may annotate the names of bones upon the planes of an abstraction of the human skeleton, without the need to define the planes explicitly. As the planes in an effective planar abstraction will correlate with the geometric details and features of a model, the planes make ideal surfaces, which may be annotated to describe domain-specific features of a surface.

Referring now to FIG. 1, system (101) comprises a generating unit (103) and user interface unit (102). The user interface is linked to an input device (105) and display device (106). The display device (106) may be a computer monitor. The input device may be a touchscreen, mouse, stylus, or the like. In an embodiment, the input device (105) and display device (106) may be provided by a touchscreen interface or stylus-enabled display. The user interface unit is configured to output display information to the display device for viewing by a user and to receive input from the user by the input device.

The generating unit (103) generates visualisations of shape representations corresponding to a 3D shape. The user interface enables a user to interact with a generation unit to render one or more shape representations. The generating unit (103) may further suggest modifications to the shape representation. These suggestions may be accepted based on instructions input by the user to the user interface unit (102). The system may be further linked to a database (104) that may be used to store user input, shape representations and/or visualization and rendering rules.

Figure 33:
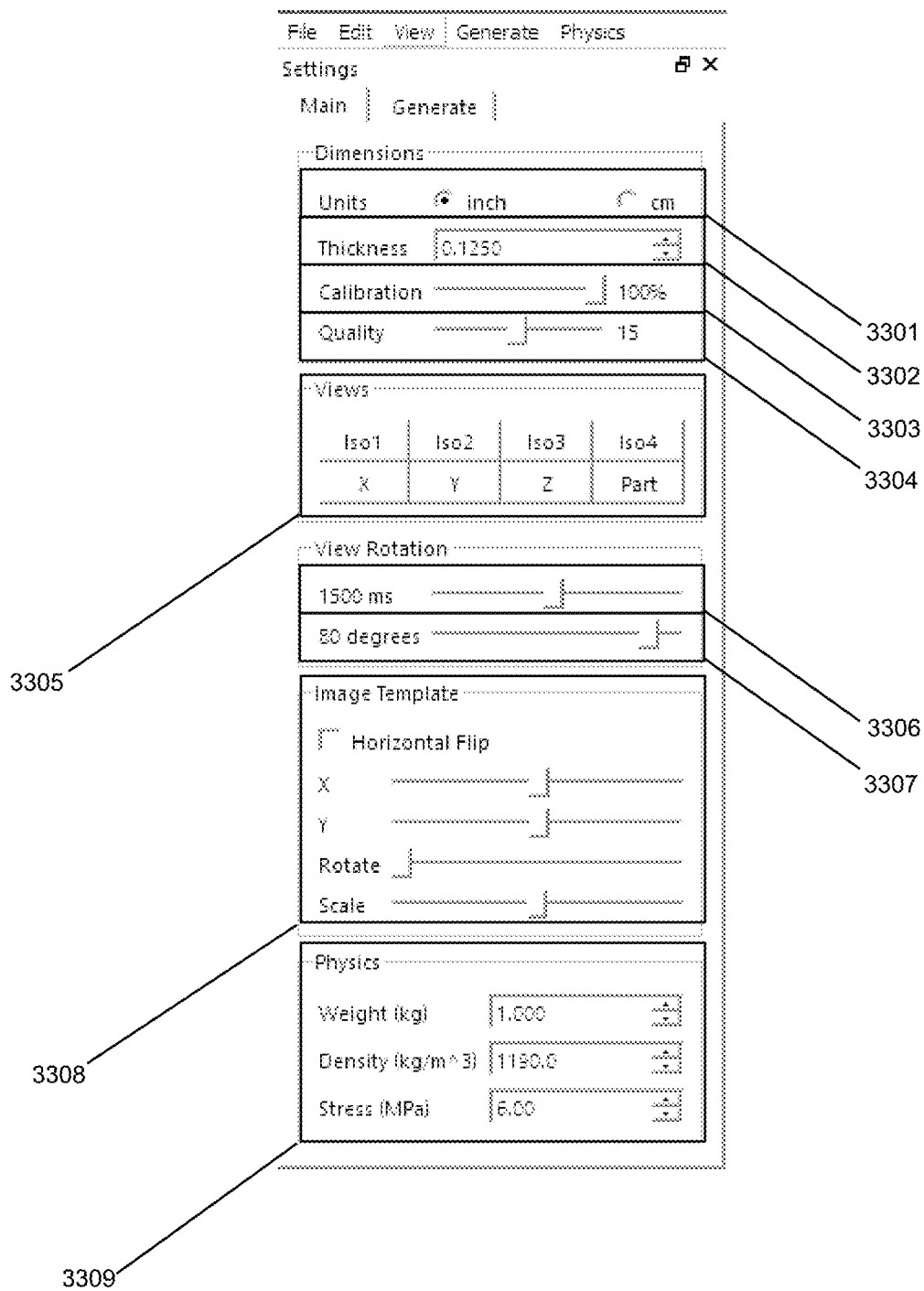
FIG. 33 illustrates a user interface for using the system.

Referring now to FIG. 33, an exemplary user interface is shown. The user interface enables importation, creation and manipulation of shape representations. As previously described with reference to FIG. 1, the user interface enables interaction by a user with the system. A user may select from a plurality of commands in order to configure, visualize or verify the structure of the shape.

In embodiments, the user may use the system to perform operations such as view a planar section 3D shape representation with particular dimensions or vantage points. In further embodiments, the user may modify the shape or an image template and perform feasibility tests as discussed in more detail below. Selectors, configurable measurements, and controls are provided to allow the user to modify planar section 3D representations. A selector 3305 enables a user initiate a particular command. A user may use a slider to adjust various views, scale, measurements, or configurations of the shape representation 3303.

An exemplary user interface is shown in FIG. 33 where the user may configure the units of measurement 3301 used to view a shape, the thickness of the planes 3302 of a shape, the calibration 3303 of a shape, the quality of the rendering 3304 of the visualization of a shape, the perspective or vantage point 3305 used to view a shape, a rotated view 3306 of a shape by distance, a rotated view 3307 of a shape by degrees, various image template operations 3308 and various feasibility tests 3309.

In further embodiments, the user interface provides operations to build and/or modify the shape using selectors, configurable measurements, and controls. These operations will be discussed in further detail below.

In further embodiments, a set of procedural operations specifically tailored to planar section modelling are provided. The system and method further provides real-time feedback to verify the model is stable, connected and may be assembled.

In further embodiments, a physics model for planar section assemblies, enabling real-time visual feedback of model stress under gravity and other interactively specified forces is provided.

In still further embodiments, suggestive interfaces may be used to aid in the resolution of failure of various feasibility tests that the system performs: stability, physical assembly and connectedness, as well as the structurally weak areas identified by physical simulation. These structurally weak areas are identified as cross-sections along planar sections, whose tensile stress exceeds that which the material is capable of handling. This causes a fracture of the material along the cross section (the planar section "snaps" along this region).

In one aspect, the system enables the importation of a shape and the automated generation of a planar section representation of the imported shape. The user may import a shape representation using the user interface and the generating unit will generate a corresponding planar section shape representation for visualization by the user interface. The generating unit generates shape representations based on a set of generation rules which can be pre-configured based upon empirical data collected from a large-scale user study on shape perception. Such empirical data informs the way in which shape features are used for the creation of planes, as discussed in further detail below. Shape features used for plane creation may be configured by the user.

To create planar sections from an existing surface, the user loads or imports a surface, which is assumed to be watertight (though given a plane-surface intersection that results in one or more open contours, one may link them together using cubic Bézier segments, for example, to create a smoothly-joined closed contour). The generating unit scales the surface so the diameter of its bounding box is a specific length. The number of units may be automatically suggested by the generating unit, or configurable. The surface is translated in the X and Z directions so that its centre is at the origin. Along the Y direction, the system translates the surface so that it rests upon the ground plane (i.e., the surface vertex with minimum Y value satisfies Y=0).

The actions undertaken by the generating unit in importing a shape representation for configuration will now be described in more detail. The user may access the user interface to input instructions for the import of a shape representation and the creation of a proxy of shape S. The generating unit produces a shape representation, a similar proxy ç of shape S using a small number of planar sections, such that ç and S are perceptually equivalent.

In some cases, displaying the minimum number of planar sections may not be perceptually desirable thus the generating unit uses an extendable set of geometric features F to populate a parameterized plane-space. The generating unit may then iteratively select those planes corresponding to the most densely populated regions of plane-space and the computation of a set of planes which may be referred to as a "super proxy", formed using the optimal planes. The super proxy may be defined by selecting a point in the discrete plane space whose plane-likelihood is above a given threshold.

The generating unit may also select planes to re-adjust the plane-space with respect to covered features, introducing new features to capture geometric relationships between the selected planes and those that will subsequently be selected. The system performs visualization using a two phase process: (i) an initialization phase, which comprises discretizing and populating the plane-space using feature set F, and (ii) a selection phase, wherein the system iteratively selects planes to cover any uncovered and populated regions of the plane-space.

In the initialization phase, the generating unit places each coordinate on the plane-space by assigning to a plane P its distance d to the origin and the polar-azimuth coordinates (Θ, φ) of its unit normal vector, such that Θ=[0,2π) and φ=[−π/2,π/2]. These coordinates are undefined when the normal vector is vertical, and discontinuous where the azimuth coordinate Θ=0 or approaches 2π. The inverse map is the parameterized plane-space. The plane-space is well-defined everywhere, but many to one when the plane's normal is parallel to the polar axis (φ=−π/2 or φ=π/2). The space of all possible planes is discretized by partitioning the plane-space into a collection of bins. In an example implementation, Θ and φ are sampled every 2 degrees, and d is sampled (or resolved) every 0.02 units. All models are centred at the origin and normalized to fit within a unit cube. Initially, all the bins are empty.

The generating unit populates the plane-space bins using candidate feature planes. The generating unit extracts a collection of geometric features $F:=\{f_1, f_2, \ldots\}$ from an input mesh. Each feature $f_i \in F$ has an importance weight $w_i$. Importance weight may be determined by computing the relative perceptual importance of shape features in visualizing 3D shape representations.

Suppose feature $f_i$ is such that it may be defined by the single plane of $n_f^T p - d_f = 0$ (some features are defined by sets of planes in fact, discussed herein). Each coordinate in plane-space ($\Theta_b$, $\varphi_b$, $d_b$) maps to a corresponding plane $n_b^T p - d_b = 0$. Note that the mapping from a plane-space coordinate to plane is subjective, as at singularities (φ=−π/2,π/2) multiple bins map to the same plane. The distance between feature $f_i$'s plane and bin b's plane is defined as as:

$$\text{dist}(f_i, b) := \arccos(n_{f_i}^T n_b) + |d_{f_i} - d_b|, \quad (1)$$

recalling that all models may be normalized to fit within a centred unit cube, which is important to note as Equation 1 is not scale-invariant. In certain implementations, discretization of a candidate plane to its corresponding bin in plane-space produces aliasing artifacts. Addressing this, the effect of a feature $f_i \in F$ may be distributed to a local collection of bins within an influence radius $r_i$ (set to 0.1 in an example implementation). $f_i$'s coverage of bin b is defined as $$c_i^b := 1 - \text{dist}(f_i, b)/r_i, \quad (2)$$

for those bins b where $\text{dist}(f_i, b) < r_i$, and set $c_i^b = 0$ otherwise. Note that since the model is normalized, contributions from angular and distance deviations are treated equally. The final weight for each bin b is then taken as the accumulated contribution over all the features as $$w_b := \sum_{f_i \in F} (w_i \cdot c_i^b).$$

Figure 2:
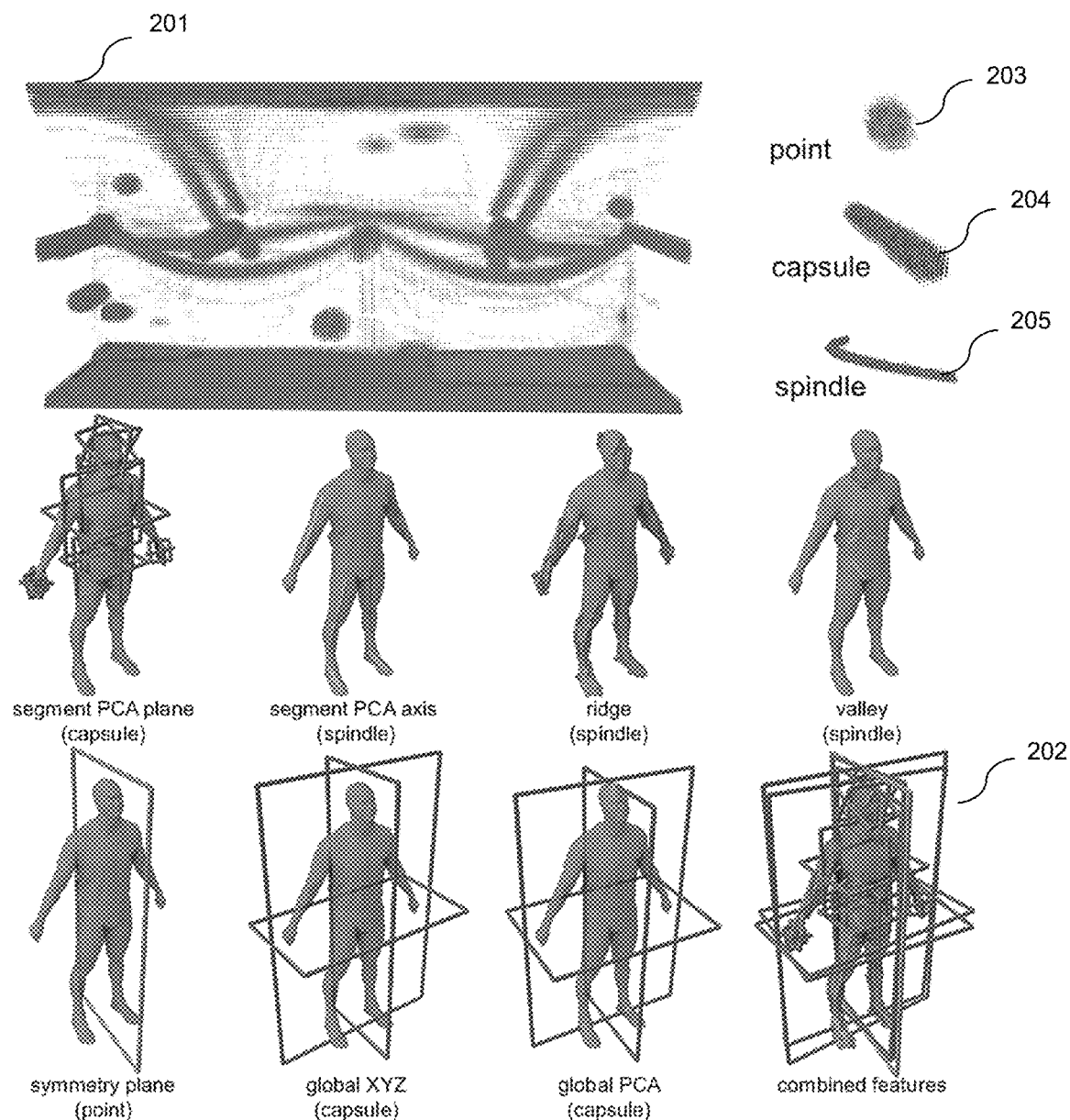
FIG. 2 illustrates exemplary models generated using the system.

Referring now to FIG. 2, an example of plane-space 201 is shown after initialization and is populated with the set of features 202 detected for an exemplary human model. In an example, three coverage forms may be defined: point 203, capsule 204 and spindle 205. Learned weights scale the importance of each feature type, and may be visualized by scaling the size of each plane-space bin.

As shown in FIG. 2, after initialization the generating unit may generate a visualization of the plane-space. In the example shown, the visualization is generated using features from an example human model with the bins labelled according to their respective feature types. Point forms may be used to represent feature types described by a unique plane, such as a symmetry plane. For other types of features, such as the global PCA planes, the plane's normal direction is important but the particular d value may not be. To capture this acceptable variation in d (i.e. ensure intersection with mesh segments relevant to the feature), the capsule form in plane-space may be used. To create this form, a slightly modified form of Equation 1 may be used, choosing a $d_f$ value in the acceptable range closest to $d_b$ to minimize the distance. Finally, feature types with a dominant axis such as segment PCA axis features and symmetry axis features are captured using the spindle form. For this form, variation in the plane's normal (varying d accordingly so the entire axis intersects the plane) is allowed. A modified form of Equation 1 is utilized where a normal $n_f$ is chosen that is both orthogonal to the axis and minimizes distance to bin b's plane. It will be appreciated that the system described herein may be extended to support new feature types with minimal effort by encapsulating them with one of the previously mentioned three forms.

The generating unit next selects a set of planes to cover the populated bins C. The current set of selected bins in P is maintained starting with an empty set P←∅. In each iteration, the bin $b^* \in C$ having maximum coverage value is selected, provided $w_b^*$ is above a threshold weight, set to 1 in this example. The chosen bin is added to the current set P←P∪b*. It may then adjust the weights of the remaining bins to account for the selection of bin b*. For each feature $f_j \in b^*$, the weights of each of the other bins containing $f_j$ may be adjusted. Specifically, bins $b_i \in C$ that are touched by feature $f_j$ are identified, and for each its contribution to weight is removed $w_{b_i}: w_{b_i} \leftarrow (w_{b_i} - w_j \cdot c_j^{b_i})$.

The generating unit next selects planar sections sufficient to cover a set of features on the shape. The set of planar sections selected may be that which comprises the minimum number of planar sections that cover the features. A large number of shape features in prior teachings are either planar, related to planes of importance in the shape, or have important contour information that may be captured within one or more planar sections. The minimum planar section may be general enough to allow the easy incorporation of other shape features. Each feature f defines a family of planes $P_f$ with positive weights $w_{P_f}$ that define how well the feature is captured by the plane. A kernel radius is defined as $r_f$ (in a 4D plane space) that is proportional to how much each plane may vary from its representative configuration. Implemented features are described below.

The generating unit performs various operations, including identifying the principal planes, global planes, ridge and valley curves, symmetry planes and axes, perpendicular supports and symmetric supports where the user provides a 3D shape for representation by planar surfaces. The operations enable the representations to include planes at a majority of important points and to simultaneously reduce the number of planes required for a representation. It will be appreciated that such an approach will typically represent the shape with relatively good visual recognition notwithstanding a minimisation of planes used.

The generating unit selects principal planes. The PCA axes of the shape and of the individual segments define the oriented bounding box of the shape and its segments, respectively. One or more of these planes captures the principal directions. Based on the relative strength of the principal directions (eigenvalues of the covariance matrix), features may be added as follows: (i) for a model with a single dominant principal axis, a single spindle form for the axis may be used, (ii) for a model with two dominant axes, a single plane feature (capsule) with normal pointing in the direction of the least significant eigenvector may be used, otherwise (iii) three planes (capsules), each having a normal in the direction of each eigenvector may be used. In the case of segment PCA planes that take capsule forms, the range of d value may be constrained so that the segment will be intersected.

Since the initial database models are mostly oriented, the global X,Y,Z coordinate axes help to ground the shape and fix its orientation with respect to the environment. Their representative planes, like PCA planes, are represented using capsule forms and may thus vary in d value.

The generating unit may provide a feature detection process. Ridge and valley curves represent extrema of surface curvature on the shape. They may be efficiently computed for detecting features at multiple scales. Most importantly, they may be considered to capture geometrically and perceptually salient surface features.

The system may split these curves into line segments, treating each as a spindle feature and giving each a weight based on segment length. Since each segment is a spindle feature, a coplanar group common to a larger ridge or valley feature (e.g. a ridge along the rim of a cup) will intersect in plane-space (with maximal coverage of these ridge segments). A strict threshold for detecting ridges and valleys may be used, instead of weighing each by a measure of strength (e.g. average principal curvature along the curve). By filtering out many potential ridges and valleys whose average curvature is low, the processing associated with adding these relatively insignificant features to the plane-space may be avoided.

Symmetry is strongly connected to shape abstraction and perception, and often is persistent across variations in object collections relating to part hierarchies. The generating unit may detect global symmetries for the entire shape. Reflective symmetries may be captured by a planar section defined by the symmetry plane itself. The symmetry is also visually clear in the shape contour of a planar section that is perpendicular to symmetry plane. Symmetry planes may be added to the plane-space as point forms, and symmetry axes as spindle forms.

Folding meshes may be used as a method to produce a kind of mesh skeleton. Similarly, the planar abstractions produced by the following account for global reflective symmetries as well as approximate local symmetries for segments through principal component analysis, and are often geometrically similar to a medial surface.

The system may capture spindle features like a PCA axis or global symmetry axis of a model using a pair of substantially orthogonal planes, with the spindle being their intersection line. If the maximal bin b* covers a spindle feature with axis direction a and intersection point p, a perpendicular support feature $f_{perp}$ may be added. Feature $f_{perp}$ defines a plane feature that also intersects the axis, but in a direction perpendicular to the plane defined by b*. The parameters for the supporting feature $n_{perp}$ and $d_{perp}$ are given by:

$n_{perp} = n_b^* \times a_f$ and $d_{perp} = -p^T n_{perp}$.

If $d_{perp}$ is negative the signs of both $n_{perp}$ and $d_{perp}$ may be flipped to keep all d values non-negative. Perpendicular supports are point forms in plane-space. Note that each spindle feature is allowed to generate a maximum of one perpendicular support.

To retain planar symmetries of the model, a plane that passes through a symmetric segment that is not almost perpendicular to the symmetry plane may be selected, The reflected plane may be added, if not already selected, as a point-form feature to plane-space to increase the likelihood that it will be selected.

For a dense mesh, the space of all planes may be discretized as being defined by all combinations of 3 vertices of the mesh. Given a value, k, a naïve algorithm would be to enumerate all combinations of k planes and pick the best weighted coverage configuration. Such an algorithm would be at least $O(n^{3*k+1})$ and potentially expensive. Equally, most features are only perfectly covered by specific planes, suggesting that a voting or clustering scheme, may work well due to simplified initializations for the planes.

Mean-shift clustering may be applied to the features that suggest specific planes. The planes for the remaining features may be initialized to be closest plane to existing cluster centres and run mean shift again. For any plane if its function for a feature results in a coverage value greater than the coverage threshold it may be considered part of the neighbourhood. Thus each cluster provides coverage over its features. Given k the k clusters with the highest weighted coverage may be selected.

Given these features, their representative planes, weights and kernel radii, given a k it may be desirable to find k planes that maximize the weighted coverage of the feature set. In another example, given an acceptable threshold value of feature coverage, it may be desirable to find a minimal set of planes that covers all features.

The planar abstraction may account for all of the topological features of the input surface.

The generating unit progressively selects planes to maximally capture shape features weighted by their importance. The generating unit applies various weights to the geometric features of a surface to optimize model visualization, assembly, stability, and connectedness. These weights may be determined by (i) obtaining a representative set of planes called the super proxy, and (ii) deriving a large number of linear inequalities from this set, to apply a constrained optimization solver to learn the feature weights. Weights may be stored in a database and communicated to the generating unit.

First, for each model, a super proxy may be formed using the optimal planes as described earlier herein. A linear system that consists of inequalities obtained from the super proxy data may be created. In one example, super proxy planes may be selected one by one in order of maximal feature coverage as long as the value of each plane is sufficiently high. For the super proxy, this importance ordering of planes may be captured by allotting values to each plane. Two types of inequalities may be derived. The first type is for each plane in the super proxy—these are planes that the system may select. It is desirable for feature weights to be such that the value of these planes (measured at the plane-space bin) exceeds the plane selection threshold. For feature types in the system, using the selection threshold of 1, super proxy plane inequalities take the form:

$$\sum_{i=1}^{10} w_i C_i \geq 1. \tag{3}$$

where an exemplary 10 feature types are chosen to be applied.

Note that these inequalities are created in order of plane selection, since plane selection influences subsequent inequalities (i.e. perpendicular and symmetric support features may be introduced). The left-hand side is the value of each super proxy plane, and is the sum of the total coverage C of each of the 10 types of features multiplied by the unknown weights. Each $C_i$ is calculated by summing the coverage across each feature of type i in the model:

$$C_i = \sum_j c_j f_j,$$

where each j indexes a feature of type i, $c_j$ is the coverage of feature j by the plane (Equation 2), and $f_j$ is a feature-specific scalar (e.g. for ridges, $f_j$ scales by the length of ridge j).

Generally, not every feature is captured by the super proxy. After processing each plane in the super proxy set and covering each of the mesh features in the plane space, there may be a number of bins containing one or more features. These bins correspond to all planes that were not selected, and so their total value in terms of the features they cover must be below a set threshold. For each of these bins, which map to a plane in model space, a second type of inequality applies:

$$\sum_{i=1}^{10} w_i C_i < 1. \quad (4)$$

Weights are chosen for the features such that they satisfy inequalities determined across models. A simple solution may involve a least squares approach to best meet the inequality constraints. However, it is desirable to satisfy the inequality constraints, rather than forcing equality relations, e.g., Relations are not differentiated once they cross the threshold value. The least squares approach results in many zeroed out coefficients as the inequalities are driven towards equality.

Simultaneously satisfying all of the inequalities may be infeasible. Numerous cases may be identified where planes in a super proxy do not have strong feature coverage. These planes corresponded to inequalities of the first type where the sum of total coverage $$\sum_{i=1}^{10} C_i$$

is low.

Intuitively, if these planes do not cover features well, they may not be very well suited for deriving feature weights. To address this, inequalities may be progressively removed, derived from the super proxy with low total coverage, until a solution is feasible. When $$\sum_{i=1}^{10} C_i > 1.5,$$

the system generally becomes feasible.

The system may use the learned weights to consistently pick planes of high user agreement, while leaving out planes of low user agreement. To regularize the solution, an objective function for the solver may be used, that minimizes the difference of each weight from 1 to be well balanced across each type of feature, specifically, $$\sum_{i=1}^{10} (w_i - 1)^2.$$

To determine the weights a function, such as a constrained optimization solver that relies upon the active set method, may be used.

The generating unit may perform various operations to improve shape resolution and scaling, including persistence of abstraction under model perturbation and transformations. The generating unit performs persistence and resilience to shape resolution and perturbation by extracting from the geometric features described above.

Figure 5:
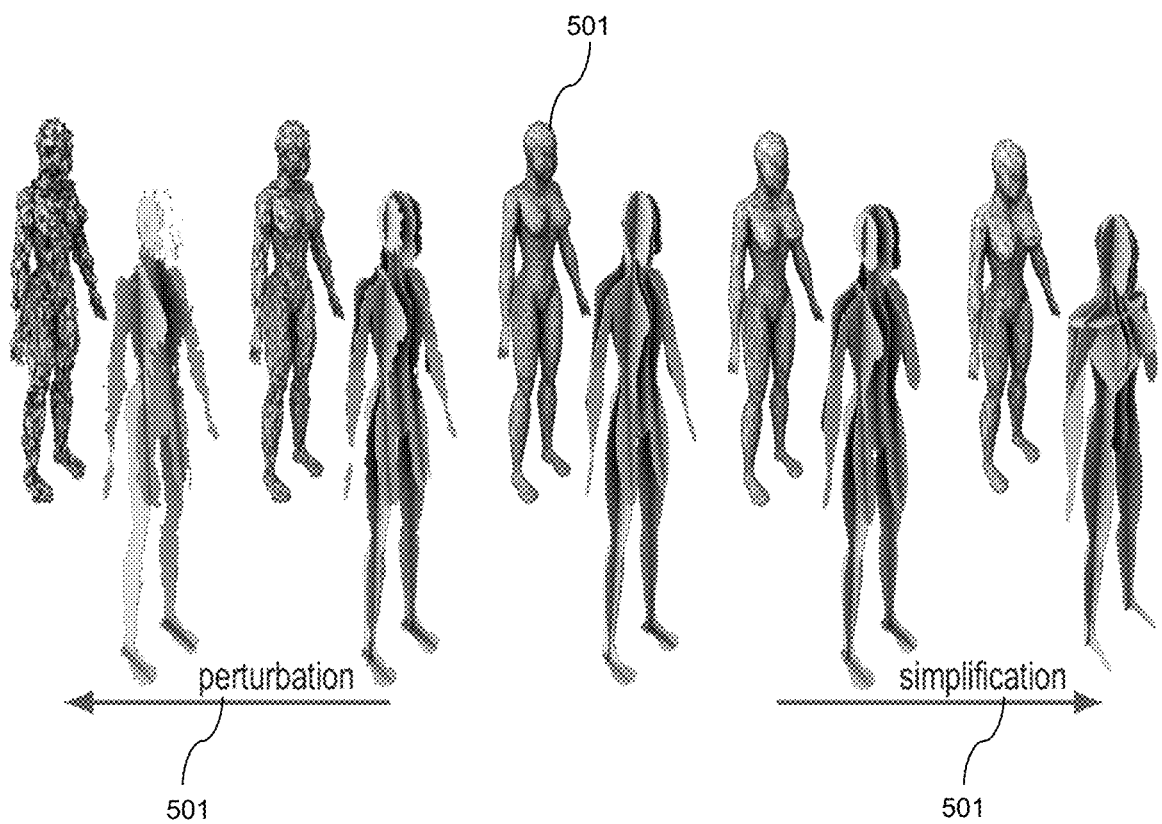
FIG. 5 illustrates exemplary models generated using the system.

As shown in FIG. 5 the generating unit may produce perceptually persistent proxies when applied to decimated or noisy versions of the original mesh. An exemplary model of a human is shown. In this example, the generating unit is shown perturbing or excluding planes of lesser importance since these features are not dominant. Also, the creation of many spurious features (e.g., ridges emerging from noise applied to vertex positions) is unlikely to result in new planes, as their weights are scaled by their lengths. An exemplary model created by the system, under increasing Gaussian noise 501 moving left 0.005, 0.01 standard deviation and increasing decimation 501 moving right 20%, 40% is shown in FIG. 5. This example shows that the generating unit may produce perceptually persistent proxies when applied to decimated or noisy versions of the original mesh.

The metric used to measure the distance between two planes involves the addition of two terms of different units, one linear and one angular. Without treatment, if the input surfaces are scaled to different sizes, this may lead to different planar section representations being generated (the scaling causes the linear term of the distance metric to change, but not the angular term).

Figure 6:
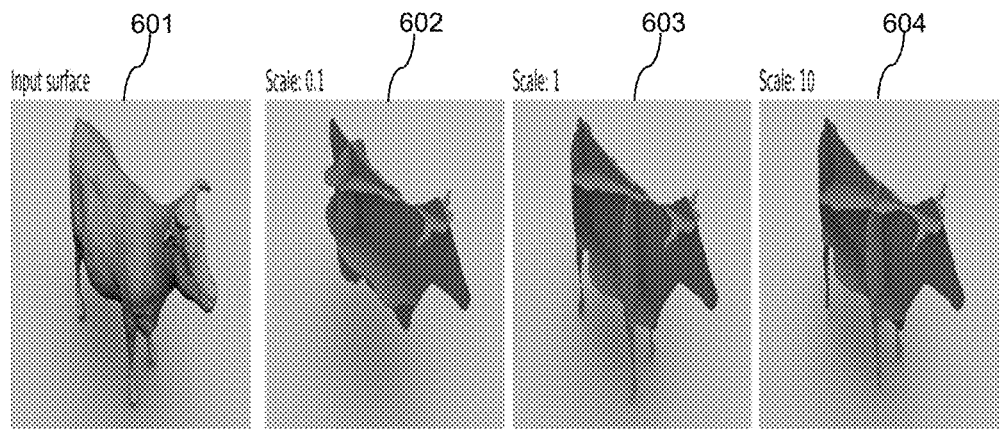
FIG. 6 illustrates exemplary models generated using the system.

Referring now FIG. 6, the effect of scale on the chosen planar sections when models are not first normalized by scale is demonstrated. Using an exemplary model of a cow, input surface 601, Scale 0.1 602, Scale 1 603 and Scale 10 604 are shown. At scales 1 and 10, a plane is chosen for each pair of the cow's legs. However at scale 0.1, a single plane is deemed adequate to cover both pairs of legs, which is not an ideal result. To address this issue with scaling, the generating unit first normalizes models to fit within the unit cube (and translates so the centre lies at the origin). This ensures that the configuration of planes in the generated representation will be the same, regardless of scale or translation transformations. A model that is not scaled to the unit cube may potentially result in an unsuitable planar section representation. The model that is scaled to 0.1 has a representation that significantly differs from the other two scales.

Referring now to rotations, recall that the parameterization for planes is non-homogeneous (e.g., when $\varphi=-\pi/2$, all values of $\Theta$ define the same plane). This non-homogeneity of the parameter space may potentially cause a bias in plane selection (i.e., the system will prefer planes that have a vertical orientation, corresponding to the "spherical poles" in the parameterization). This may potentially result in the system producing a different representation for a rotated model.

However, features may be represented by a volume in the plane parameter space that may contain many bins. The volume of a feature in plane parameter space near the "spherical poles" ($\varphi=-\pi/2,\pi/2$) is much larger than a feature near the "equatorial line" ($\varphi=0$), where volume is evaluated by counting the number of bins within the volume. This difference in the shape of feature volumes based on location in the parameter space compensates for its non-homogeneous nature.

Figure 7:
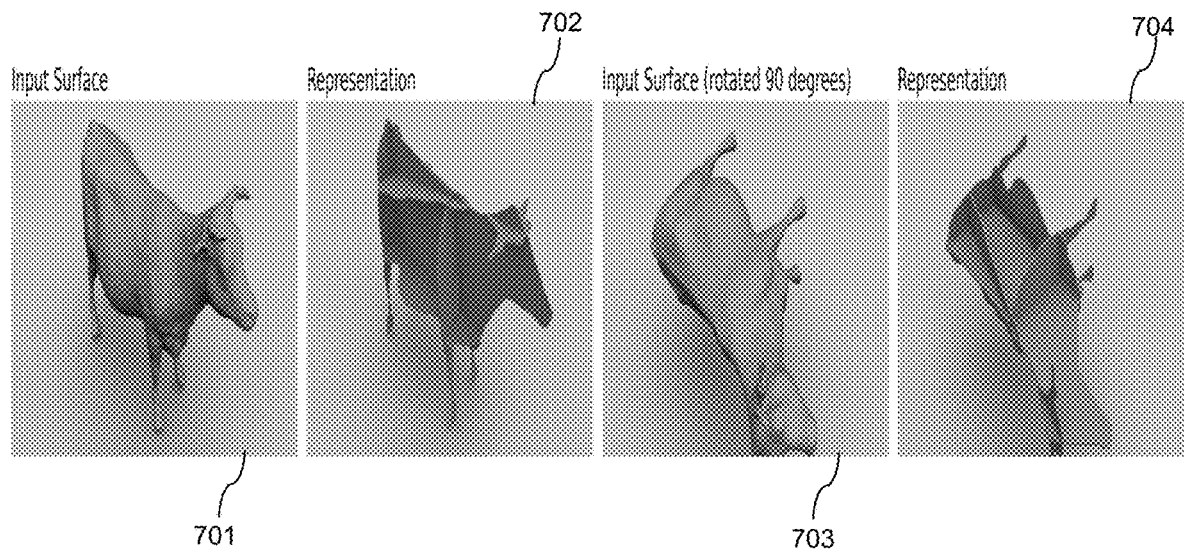
FIG. 7 illustrates exemplary models generated using the system.

As shown in FIG. 7, the planar section representations for an exemplary model with and without a 90° rotation applied have the same local configuration. Input surface 701, representation 702, input surface rotated 90 degrees 703 and representation 704 are shown.

Another reason why rotations are not a concern is that the features themselves are transformed with the model. As an example, in a model that has been rotated 90 degrees 702, all but the global XYZ features will be rotated accordingly. Then, since the feature volumes are transformed in the plane parameter space, the bins corresponding to selected planes will differ. Use of the global XYZ features or any features that do not vary with rotation may be disabled.

The system may enforce plane orthogonality (or substantial orthogonality) since intersecting planes almost always meet orthogonally. Orthogonality may also be enforced for manufacturing-related reasons. Laser cutters only make cuts in directions orthogonal to the plane normals, and for materials with substantial thickness, planes that do not meet up orthogonally have a loose connection due to a widened slit to accommodate the angle of the plane, and may freely pivot on the slit axis. Multi-axis CNC milling machines may cut in non-orthogonal directions creating tighter connections, but such devices are less accessible.

It has been found that sketching planar contours onto canvas planes that are not viewed frontoparallel consistently result in unpredictable contours that deviate significantly from one's intention, and that users tend to sketch curves from a view at or near frontoparallel. Thus, another principle guiding the design of the present system is that frontoparallel views may be used during curve sketching.

It has been found that users overwhelmingly prefer a single 3D view for multiple reasons: a large single-view maximizes screen space allowing more detail to be seen; attention is not shifted between views; cursor motion is not shifted between views; and a single-view provides greater context relating the position of existing curves and planes with a new curve. Thus the present system creates a single-view 3D design interface.

Figure 8:
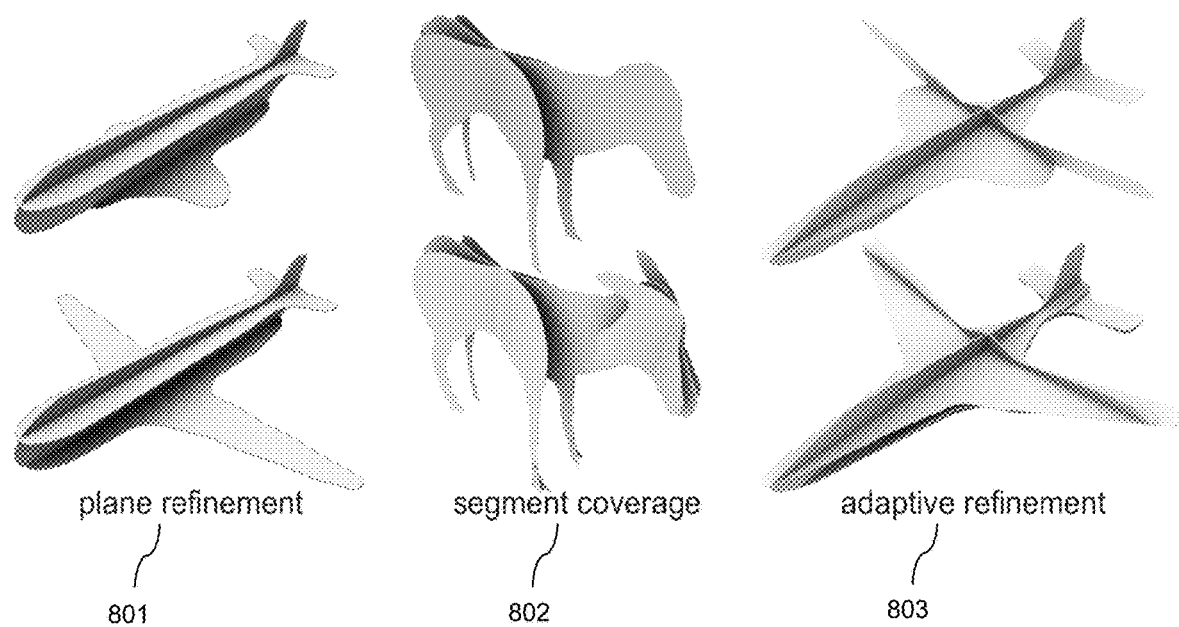
FIG. 8 illustrates exemplary models generated using the system.

The generating unit performs optimizations to generated proxies. Several examples are shown in FIG. 8.

Adaptive threshold 803 enables the user to manually include or automatically configure the threshold of desirable planes to be included below the default threshold. Tuning the threshold allows users to refine the planar proxies created by the system to select more (or fewer) planes.

The discretization of plane-space may cause selected planes to minimally deviate from the features they capture. To avoid this deviation, the generating unit performs plane refinement 801 whereby a bounded linear search through plane-space in the vicinity of a selected plane to maximize section area or perimeter may improve the visual quality of the planar section.

The generating unit may automatically, or be configured to cover segments 802 beyond the threshold for planes that section uncovered segments. The system may optimally segment a 3D curve into a sequence of planar curve or axial segments, minimizing both the number of segments used and the error to the best-fit plane/line for each curve segment. A penalty $E_{cost}$ for each planar/linear piece results in:

$$M(a,b)=\min_{a<k<b}(M(a,k)+M(k,b),E_{fit}(a,b)+E_{cost})$$

where M(a,b) denotes the minimal cost of a configuration of piece-wise planar curves or lines from point a to b. $E_{fit}(a,b)$ denotes the error in fitting a least squares plane or line to the range of points from a to b.

In another aspect, the system enables user-directed creation of a planar section (i.e., from "scratch") using the user interface.

Figure 9:
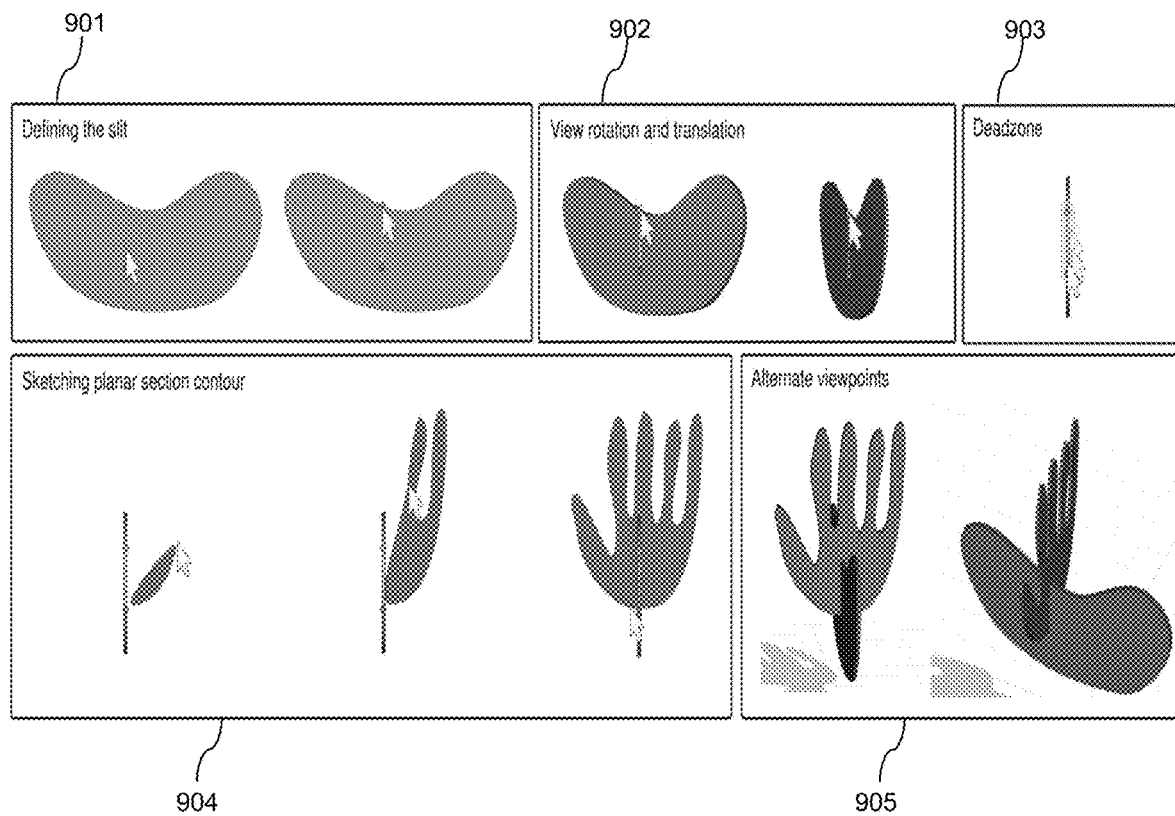
FIG. 9 illustrates exemplary models generated using the system.

The user may direct via the system the user interface to define a new planar section. A user action consisting of a single stroke, as illustrated in FIG. 9, defines that plane and will be discussed in more detail below. The stroke establishes both the placement of the slit and the shape of the plane.

The stroke first defines the slit, where two orthogonal planar sections join. The stroke starts on the interior of an existing planar section, defining one endpoint for the slit axis. The slit is defined when the cursor exits the planar section interior. A new plane is defined with a normal orthogonal to the slit axis and existing planar section normal, and intersects the slit endpoints.

As shown in FIG. 9, the user interface enables a user to apply a single stroke to create planar section. The stroke has a starting point and an ending point, the starting point being a point within the section and the ending point being the location of the cursor as it reaches a boundary of the section. In the example shown, the stroke defines the slit for the planar section 901 and the subsequent orthogonal plane, and the system rotates to a frontoparallel viewpoint 902, while keeping the slit endpoint beneath the cursor 902. The user moves the cursor outside of a dead zone 903 and sketches the subsequent planar section contour 904.

It has been found that users feel constrained being forced to start the planar section contour at a slit endpoint. The dead zone, a capsule shaped region in the viewport around the slit, addresses this issue. The dead zone prevents the planar section contour from being defined until the cursor exits the region, which has a fixed radius relative to the dimensions of the viewport. A planar section contour may thus begin near either slit endpoint, or anywhere in between. Alternate views 905 of the newly-created planar section are shown.

The generating unit rotates the view so the new planar section may be viewed by the user as frontoparallel. Importantly, rotation is constrained so the slit endpoint remains fixed beneath the cursor. Reasons for this approach include that the rotation is predictable—an unknown or arbitrary pivot point is not used and cursor movement controls view translation and is used to ensure sufficient space is available to draw the next planar section contour.

The user may specify an angle for the rotation using the user interface to select a view direction 15 or 30 degrees from the axis of the canvas plane normal. $\Theta$ is defined as the desired angle between the new view direction and the axis of the new canvas plane's normal.

As the user sketches, the generating unit fits a cubic Bezier spline, with a final Bezier segment to close the curve. When the stroke is completed, the planar section is created, completing the interaction. When there are no existing planar sections to start with, the contour is defined on a frontoparallel viewed plane that intersects the origin, the point where all models are centred and normalized to fit within a unit cube.

Figure 10:
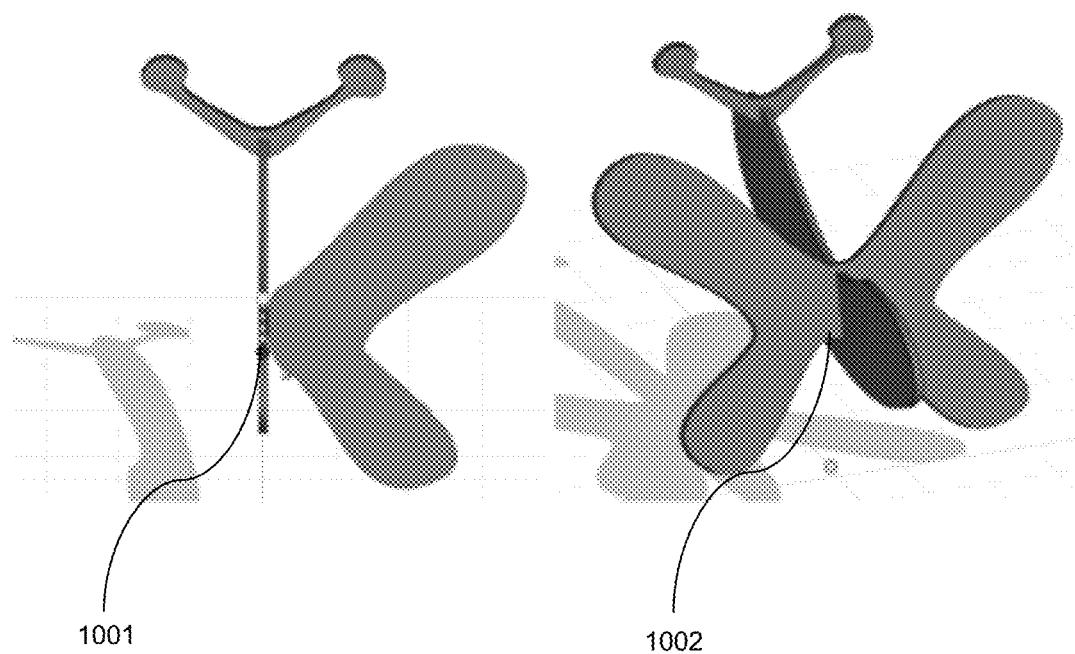
FIG. 10 illustrates exemplary models generated using the system.

Referring now to FIG. 10 an exemplary model generated using the system is shown. The user may generate a planar section contour by inputting a stroke principally on one side of the slit axis 1001 and the generating unit mirror the stroke across the slit axis 1002. If the ratio of maximal distances of the stroke on either side of the axis is sufficiently high, the stroke is mirrored across the axis and smoothly joined. Subsequent planes can be generated in like manner beginning with creation of a slit in the existing sections.

The created planar section contours may be free to deviate from surface contours either during creation or may be adjusted at any point afterward to ensure proper contact with the ground plane.

Figure 11:
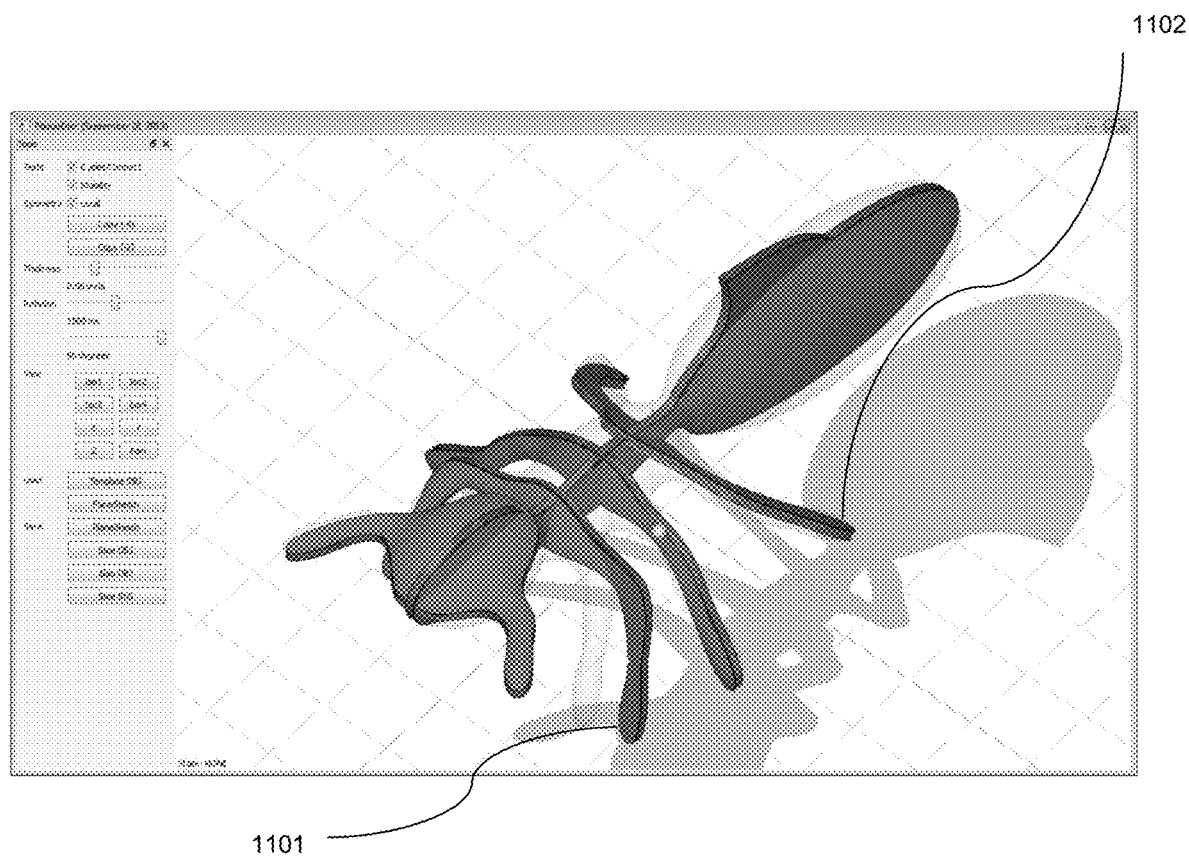
FIG. 11 illustrates a user interface for accessing the system.

Referring now to FIG. 11, an existing surface representing an ant is shown. The generating unit may render the surface transparently, to serve as a guide for stable planar section creation. This ensures that regions of planar sections created within the surface are clearly visible as shown in FIG. 11. Note that in some regions the planar section contours deviate significantly from the surface (such as the front left leg 1101, or protruding fin at the rear 1102), as the artist has freedom to deviate from the surface template.

The system may select a frontoparallel canvas plane that passes through the origin. For any initial view of the surface the user selects, planar contours resulting from an intersection between the canvas plane and surface are identified. These may be called guide curves. The guide curves are curves which lie upon an imported surface. Guide curves may be traced over to define the shape of a new planar section. Points of a user's sketched stroke which are close to a guide curve may snap to the guide curve. This mechanism allows the user to draw strokes which precisely match the shape of the input surface, while also allowing the freedom to deviate from this shape.

Guide curves are constantly updated as the slit (and thus canvas plane) are defined. The interactive visualization of the guide curves informs the user, allowing them to adjust the slit direction until they find the guide curve satisfactory. A frontoparallel view of the planar section before defining the slit results in the guide curve appearing as a line segment, which is often sufficient; however, a user may to select a non-frontoparallel view to view the guide curve profile explicitly along two different directions.

When a canvas plane has been defined for the user to sketch a planar section contour along, the guide curves are visible. For each point of the user's sketched stroke, if the point is within a distance δ of any guide curve, the point may be translated (or snapped) to the nearest point on that guide curve. In an example implementation, a fixed threshold of δ=0.5 is used by default. As an alternative, one might employ the peeling interface for curves presented by Takeo Igarashi, Tomer Moscovich, and John F. Hughes. As-rigid-as-possible shape manipulation. In *ACM SIGGRAPH 2005 Papers*, SIGGRAPH '05, pages 1134-1141, New York, N.Y., USA, 2005. ACM., which is incorporated by reference herein, to dynamically define this threshold, based on the distance from the curve the user deviates. The automatic snapping behaviour allows the user to create planar section contours that may either follow guide curves precisely or allows for deviation from them. This process is shown FIG. 12.

Figure 12:
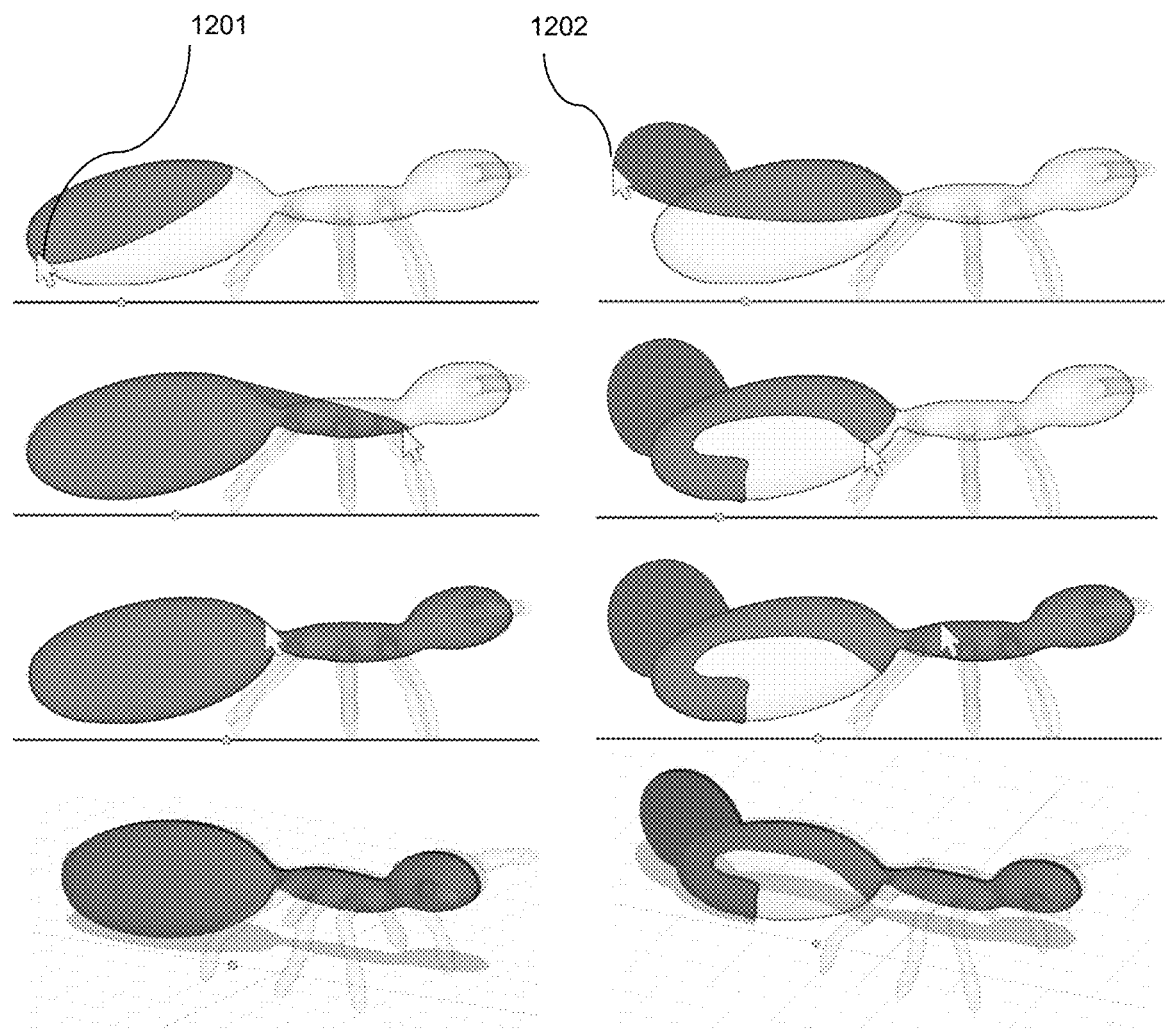
FIG. 12 illustrates exemplary models generated using the system.

Referring now to FIG. 12 a user may create planar section contours. The user may sketch roughly along a guide curve to define a planar section contour that conforms precisely to a planar surface contour 1201. In another example, the user's sketched curve deviates significantly from the guide curve 1202. The current interactive system provides the flexibility to create planar section representations to precisely match or significantly deviate from the shape of an existing surface.

Figure 13:
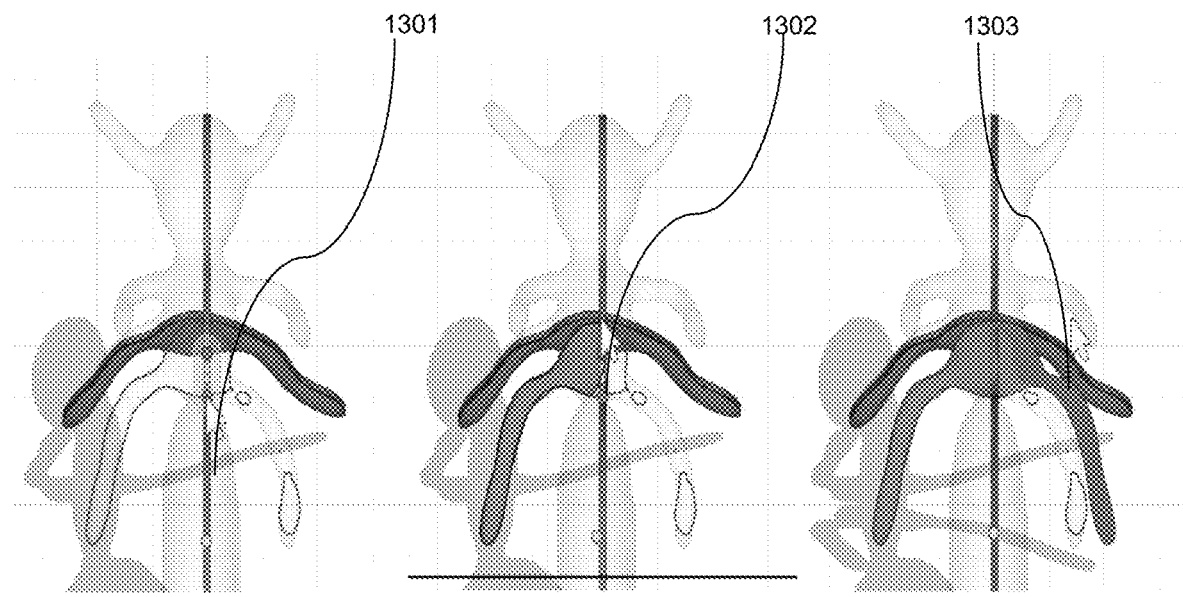
FIG. 13 illustrates exemplary models generated using the system.

Referring now to FIG. 13, an example of a model created using the system is shown. In this example. the articulated rear right leg on the surface of an ant results in a poor guide curve on the right side 1301. The user may sketch along the guide curve on the left side 1302. The sketched stroke is mirrored across the axis, producing a symmetric planar section 1303.

There may be advantages to applying such an automatic symmetry approach when working with an existing surface in the case where the surface has articulation on only one side of the slit axis. For example, the planar section contour for the non-articulated region may be sketched, and a symmetric planar section contour will be created as if it came from a surface that was not articulated on both sides. This "automatic symmetrization" of a planar section maybe useful for creating a planar section representation that is a symmetric variation of an asymmetric input surface as shown in FIG. 13.

The surface contour defined by points whose normals are orthogonal to the plane normal may be used instead of the interior volume bounded by a surface. Such contours define the boundary of the silhouette when the surface is viewed orthographically with a view direction parallel to the plane's normal. Once the non-planar silhouette contour is created, it may be projected onto the selected plane, flattening it and allowing the creation of a planar section. This silhouette-based approach captures all segments of the surface. The generating unit selects only the regions of the surface near to the selected plane. Furthermore, the generating unit performs a magnetic cut whereby the surface is deformed to pass through the plane when points come within a specified distance.

Figure 14:
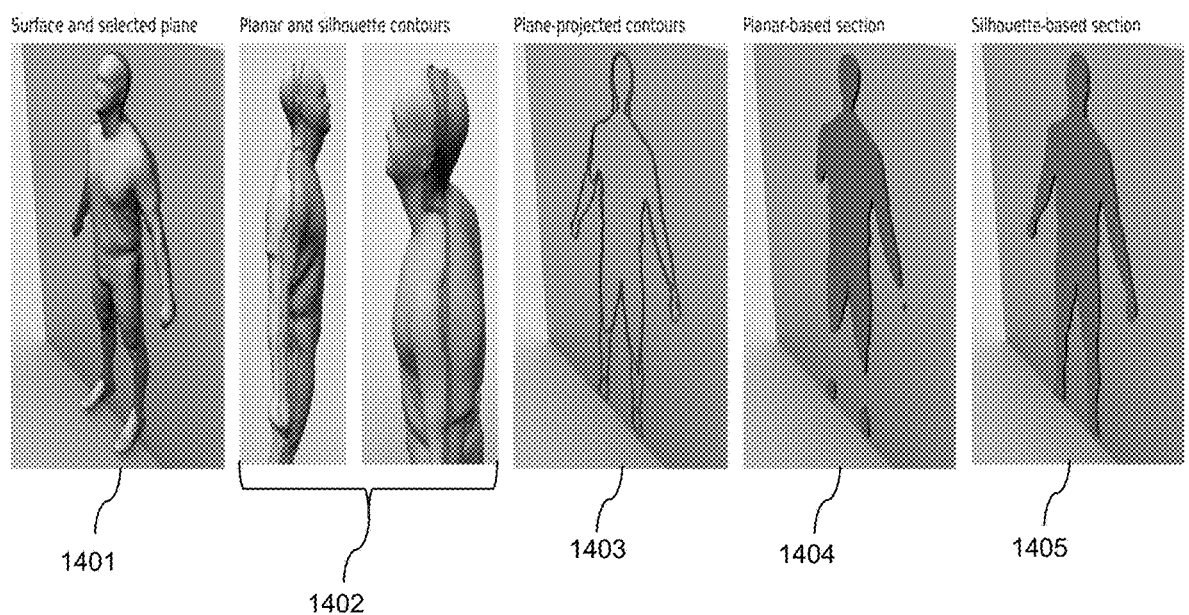
FIG. 14 illustrates exemplary models generated using the system.

Referring now to FIG. 14, an example of a human model displaying various contour approaches is shown. Given the input surface and a selected plane, two contours are formed: the traditional planar section contour 1404 and the non-planar silhouette contour 1405. The silhouette contour is defined by all points on the surface where the surface normal and plane normal are orthogonal. The silhouette contour is made planar by projecting it orthogonally onto the plane 1402. The traditional plane-based approach misses segments of the surface (the right arm, left hand, and calves) 1404 while the silhouette-based approach captures far more segments 1405.

Figure 15:
FIG. 15 illustrates exemplary models generated using the system.

Referring now to FIG. 15, an example visualization is shown corresponding to a magnetic cut. The plane 1501 is shown, and the field of influence 1502 is shown. As the plane is translated upward, vertices of the surface 1503 enter the field of influence, and are translated along the plane's normal direction to a new position based on their surface normal.

Points within a distance threshold to the plane are attracted along the plane's normal direction towards the plane. The surface to pass through the plane when points come within a specified distance is deformed. The adjustable distance threshold defines a field of influence. Specifically, for surface points that come within the field, the vertices along the plane's normal direction are translated based on the surface normal direction at that point as shown in FIG. 15.

Surface points whose normal is parallel to the plane's normal may be translated to the boundary of the field; surface points with a normal orthogonal to the plane's normal will be translated onto the plane. In practice, this deformation is analogous to a magnetic force that pulls the surface across the plane wherever it enters the field of influence. Thus, the magnetic cut is an approach to creating a planar section that is geometrically equivalent to a silhouette, but also incorporates locality—the deformation is applied only where the surface falls within the field of influence.

The deformation will now be further defined. The generating unit considers a surface point P with surface normal $N_S$ within the bounds of the magnetic field. The bounds of the magnetic field reach a distance r from the plane, the plane is defined as introduced by a normal N and plane point $P_0$. The updated vertex position P' will be:

$$P'=P+N(N\cdot P_0-N\cdot P)+N(N_S\cdot N)r. \quad (5)$$

The first two terms on the right hand side project P onto the plane along the normal direction N. The last term translates P within the field according to the dot product of the plane normal and surface normal.

Once the generating unit makes the deformation, a planar section is formed by the intersection of the plane and deformed surface. The deformation of the surface is ideal in the sense that the planar section contour will be locally maximal in terms of its surface area.

Figure 16:
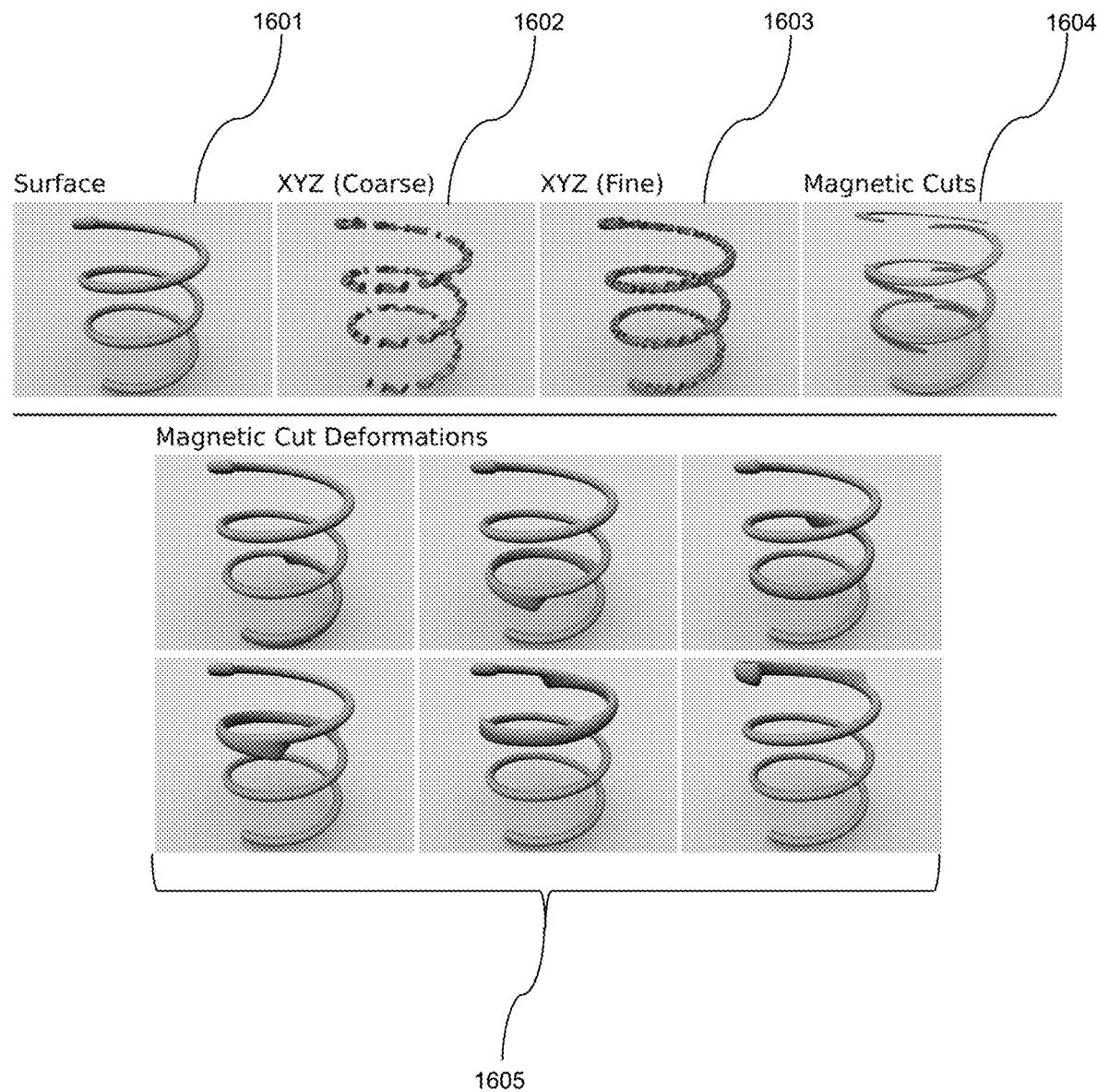
FIG. 16 illustrates exemplary models generated using the system.

However, some surfaces are not amenable to planar section representations—for instance, a thin helix-shaped surface, whose medial axis has both non-zero curvature and torsion as shown in FIG. 16.

Referring now to FIG. 16, an example is shown of a surface representing a thin helix 1601, whose non-zero curvature and torsion would typically make planar section representations problematic. Planar section approaches such as using regularly-spaced XYZ sections are shown 1602 and 1603. These require many cuts for an adequate representation, however using magnetic cuts 1604 only 6 planar sections are needed. The 6 surface deformations used for each of the planar sections of the magnetic cut representation are shown 1605.

Figure 17:
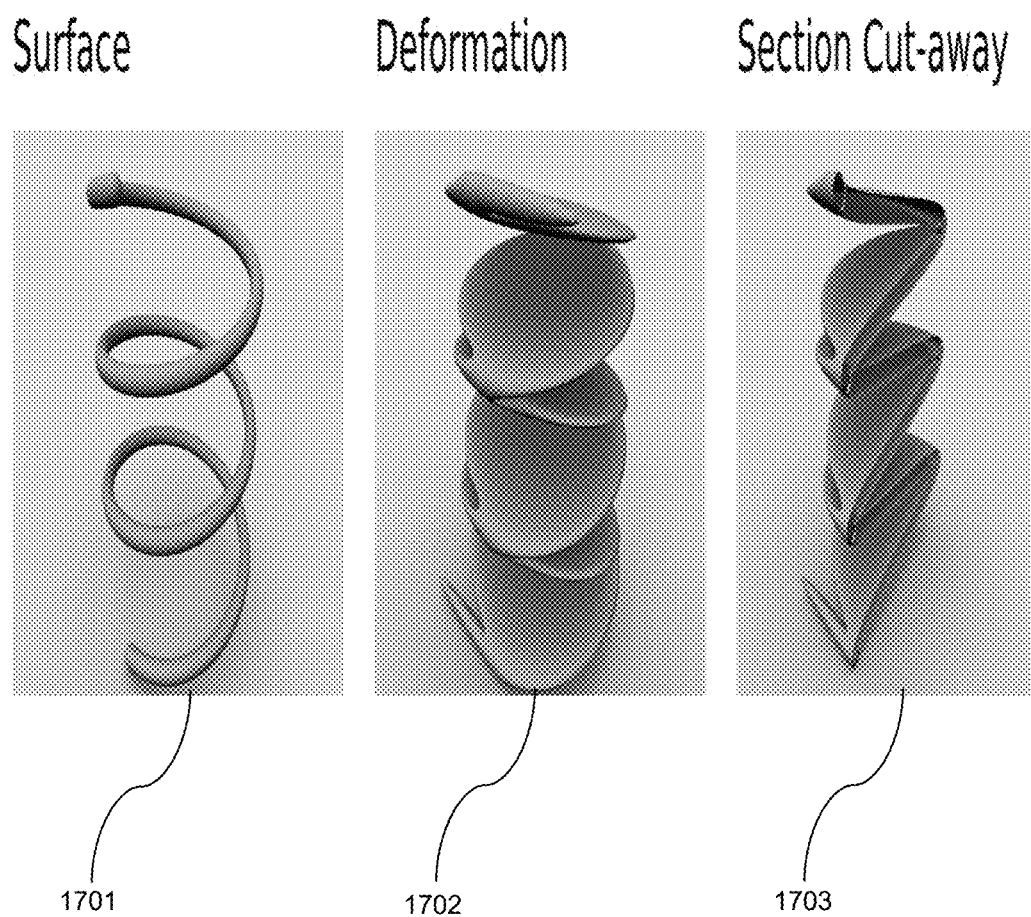
FIG. 17 illustrates exemplary models generated using the system.

Referring now to FIG. 17 an example of a surface displaying problems with the magnetic cut approach is shown. The magnetic cut's plane 1703 is used as a geometric clipping plane. For such surfaces 1701, a satisfactory representation consisting of a small number of purely planar primitives may not be possible—the "purely planar" doctrine fails. The goal of the magnetic cuts approach is to produce a representation that is reasonable, but there are obvious problems: first, the surface deformations 1702 involved may lead to planar sections that are geometrically distant from the original surface. Secondly, there is a problem of connectedness between planar sections in the representation. The system may suggest extra planar sections for the user to link the sections manually, or automatically impose the extra planar sections.

Figure 18:
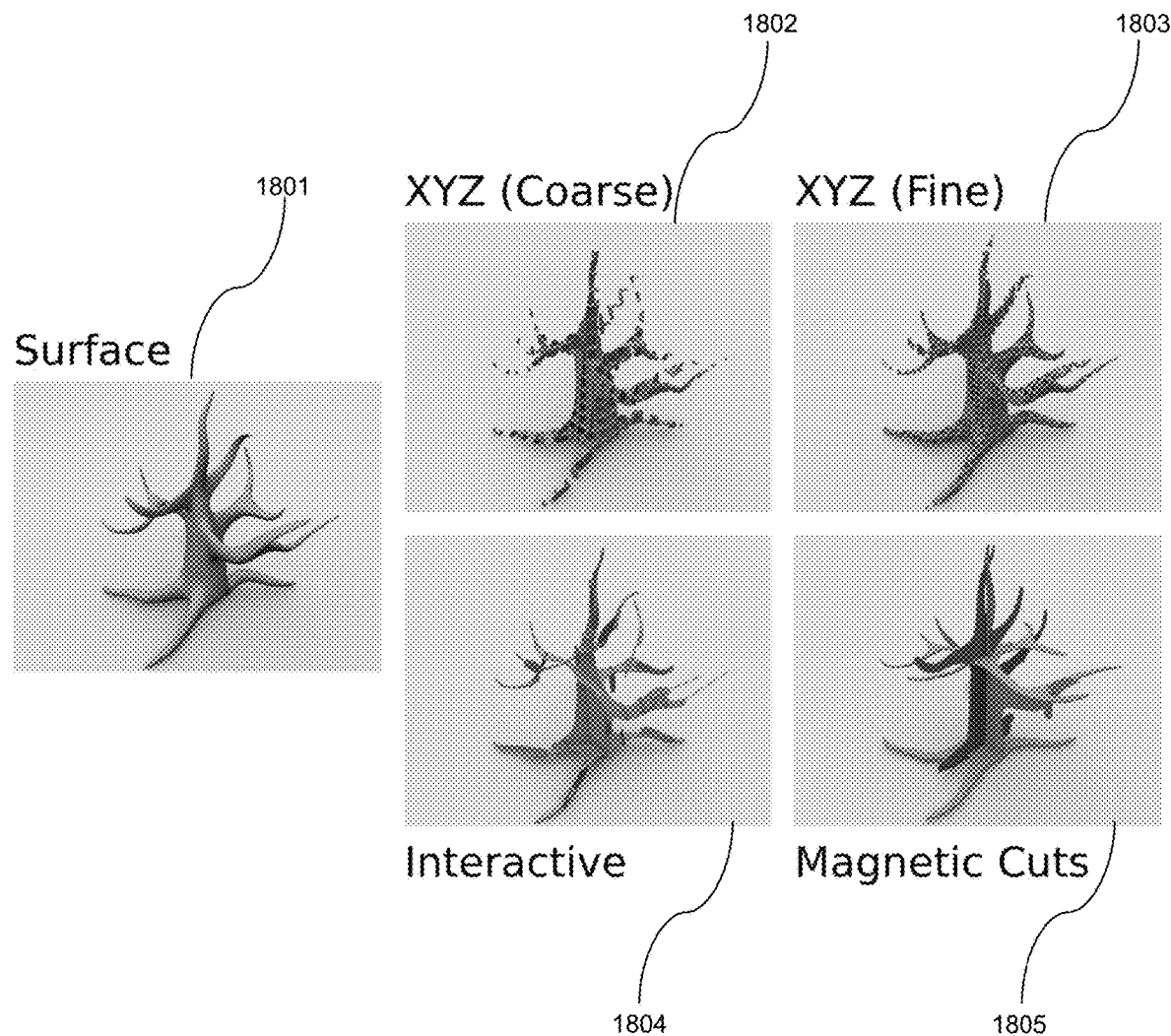
FIG. 18 illustrates exemplary models generated using the system.

Referring now FIG. 18, an example of a surface 1801 with thin, curving branches is shown to exemplify a shape typically problematic for planar section representations. The surface 1801, regularly-spaced XYZ sections 1802 and 1803, interactively-authored planar sections 1804, and magnetic cuts 1805 are also shown. The numerous thin branches that bend in various directions may be modelled, purposely made to be non-planar. A number of methods for creating planar section representations are shown in FIG. 18.

Many sections are required for the XYZ style to capture the surface, as a coarse-grained spacing does not adequately represent the branches as shown. Interactive creation of the planar sections along the highly-articulated branches is possible, prior art displays this process is somewhat tedious. Using magnetic cuts, only 4 planar sections were required to represent all segments of the surface, and the example may be able to be created in far less time.

Figure 19:
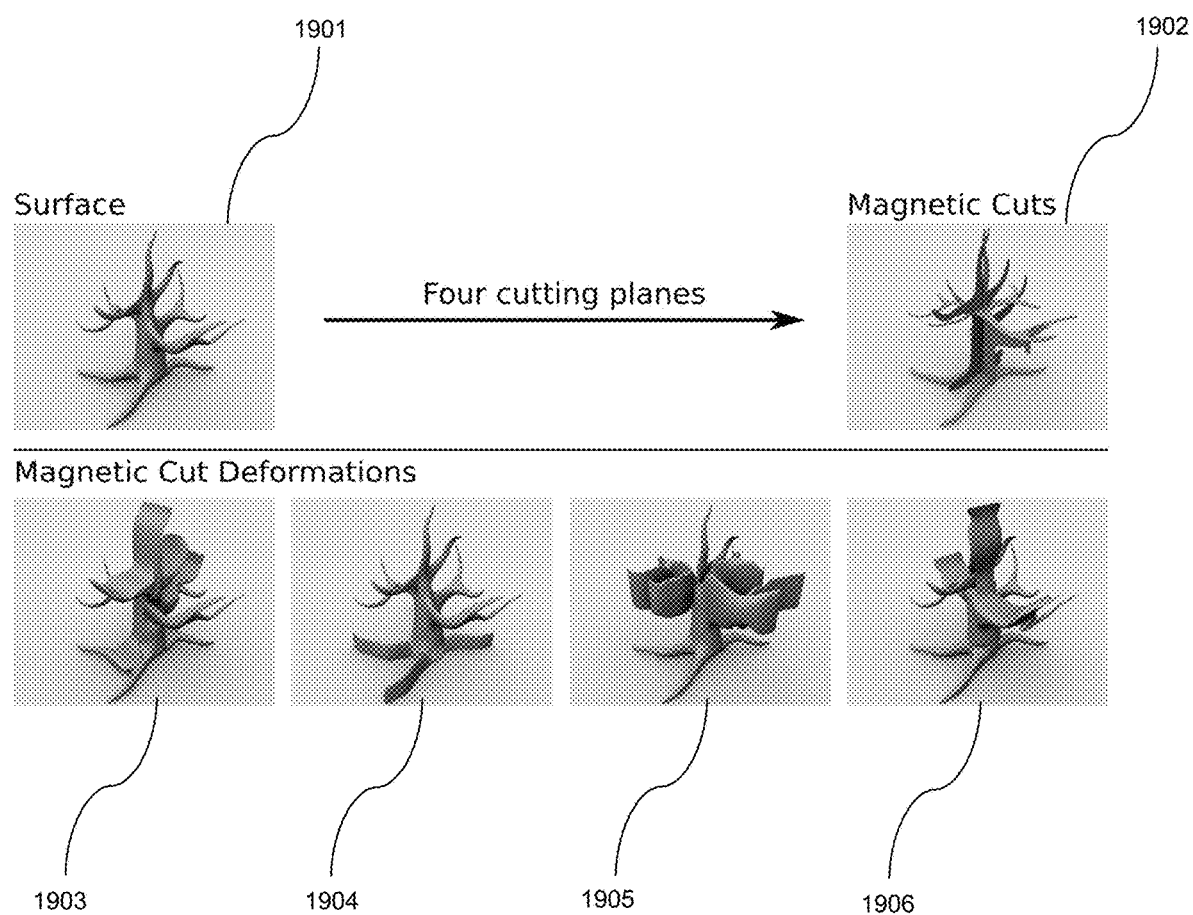
FIG. 19 illustrates exemplary models generated using the system.

Referring now to a further example of a shape representation shown in an exemplary user interface, FIG. 19 displays the surface 1901 and output planar section representation 1902 consisting of four magnetic cuts of the surface. Each of the four deformations of the surface required to obtain the contours for each planar section 1903-1906.

Note that a surface deformation is applied independently for each plane. As shown in FIG. 19, the deformation is not a continuous one, and the planar sections that are created often do not fall within the interior volume defined by the surface as they do traditionally. Because of this, planar section representations composed of magnetic cuts may be thought of as stylized representations of the original surface.

The system allows a user to perform various procedural operations in order to modify a planar shape representation that was either created by the user or imported and automatically created.

The generating unit may perform various replication operations, including blend, grid, radial contouring and branching. The user interface enables the user to select and configure each operation. The operations enable the representations to be created in such a way that they will be stable for assembly or manufacture. In addition, these operations allow the user to create 3D shape representations quickly and while enforcing desired design principles such as symmetry.

Figure 32:
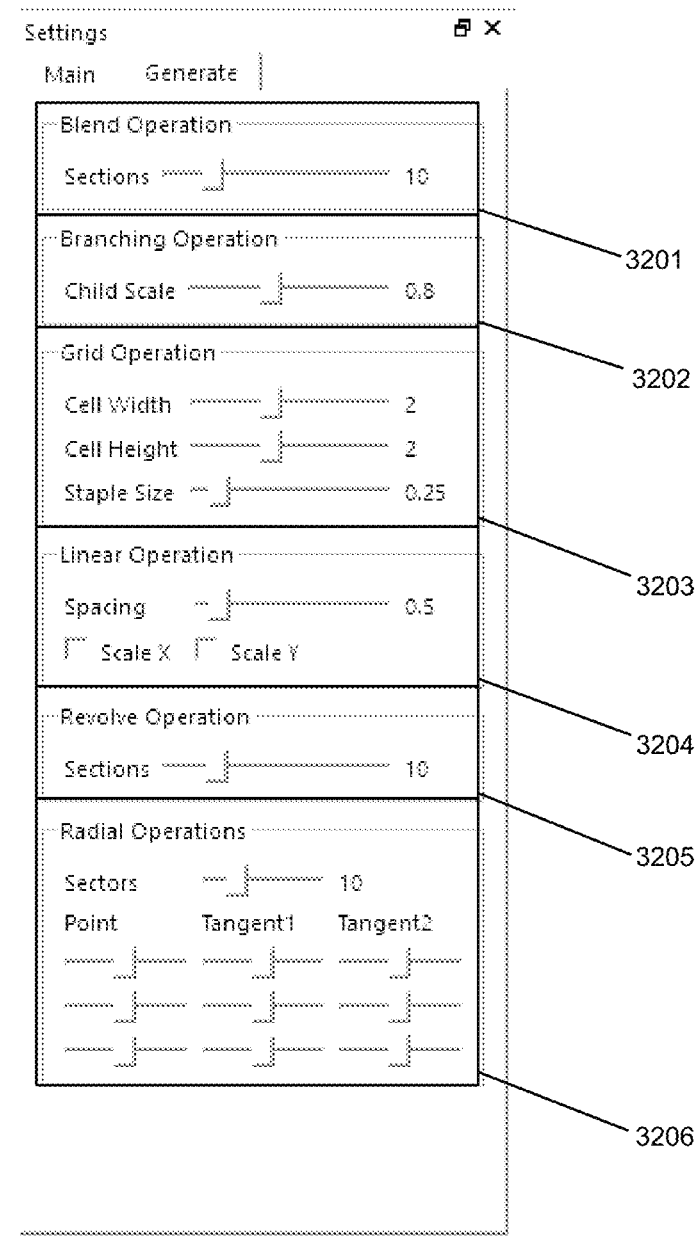
FIG. 32 illustrates a user interface for using the system.

Referring now to FIG. 32, an exemplary user interface is shown that may be used to perform replication operations, to be described in more detail below, such as blend 3201, branch 3202, grid 3203, linear 3204, revolve 3205 or radial 3206. These operations may be performed by selecting a command to generate the blend, branch, grid, linear, revolve or radial and various attributes of the operation may be adjusted using a slider or selector. Example attributes include number of sections, scale, width, height, staple size, spacing (whether on x or y axis) or sectors and the points, or tangents on which those sectors may lie. Such operations will be discussed in more detail below.

Figure 20:
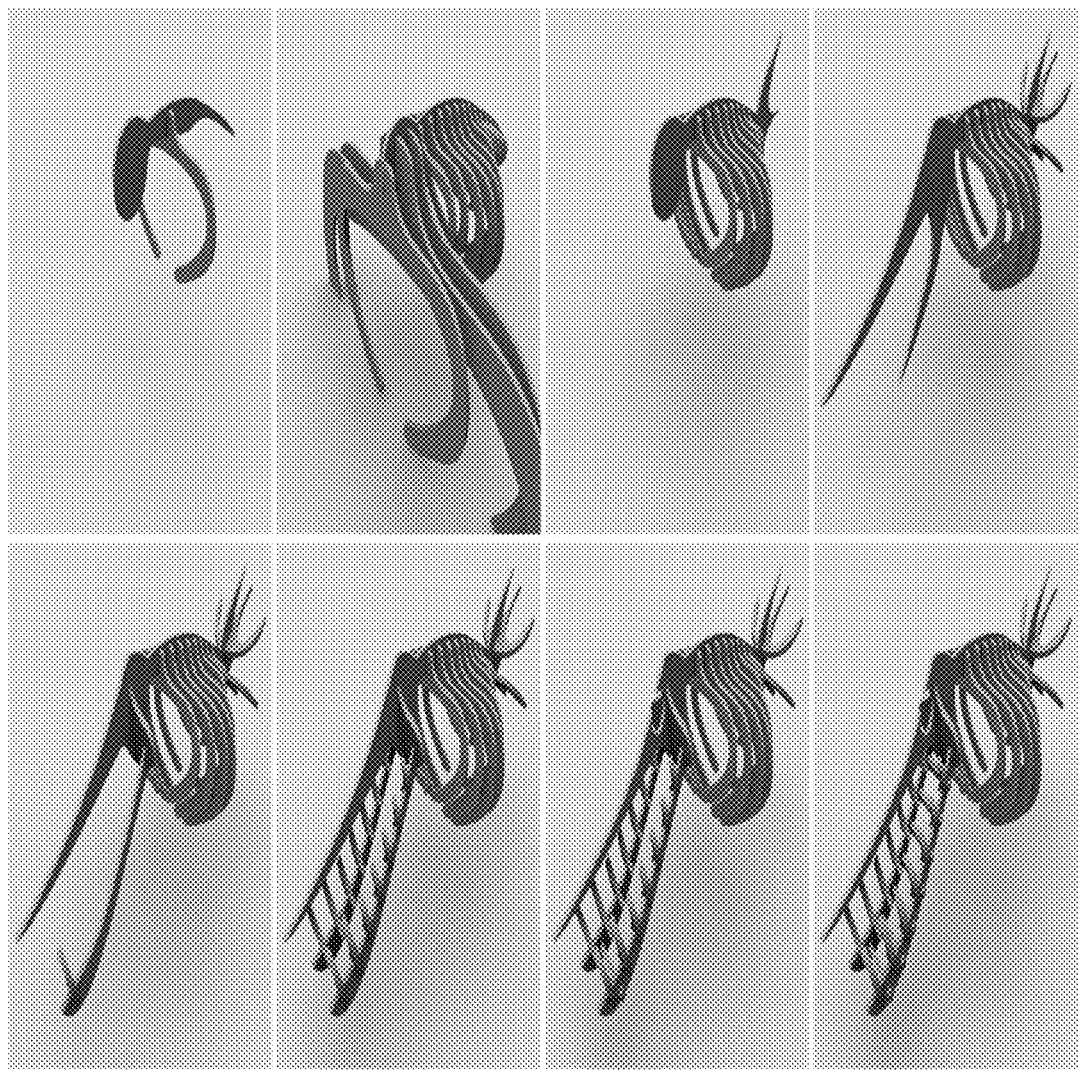
FIG. 20 illustrates exemplary models generated using the system.

The system provides generation of linear operations. Referring now to FIG. 20, an exemplary user interface for applying linear operations to a shape representation is shown. The user may select the option to duplicate planar section contours using the user interface. In this example, linear operations create the rib cage, teeth and jawbone for a planar section representation of a fish skeleton. Duplicated planar section contours may be scaled in both directions on the plane based on the cross-sectional width of the base planar section, creating variation along the rib cage and teeth.

The generating unit defines a family of shape operations that replicate duplicated planar sections along a root planar section. The linear operation makes a linear arrangement of duplicates, along one side of the root planar section, preserving the normal direction of the duplicated planar section at fixed offsets. The sections are also translated along the intersection axis, to account for the spatial variation along the root contour; the translation ensures that the line of intersection between duplicate and root is of equal length for all duplicates as shown in FIG. 20.

To create variation for duplicated planar sections along the contour of the root planar section, the generating unit measures the thickness of the root. The thickness at a position along the root is executed by casting a ray on the root plane that intersects the contour. The distance between the two points of intersection that surround the line of intersection between duplicated and root planar sections is used as the thickness value. The thickness value is used to scale the contour of the duplicated planar sections, making their size larger or smaller. When scaled, duplicated planar section contours may be translated so that their line of intersection with the root is in proportion with the duplicated and root planar sections (sections are smaller as the root's planar section gets thinner, and larger when the root section gets thicker 2003).

The system may allow for automatic local symmetry in addition to providing the user with the ability to duplicate planar sections across specific planes. The system may automatically make the corresponding edit to the other side to enforce global symmetry.

Figure 21:
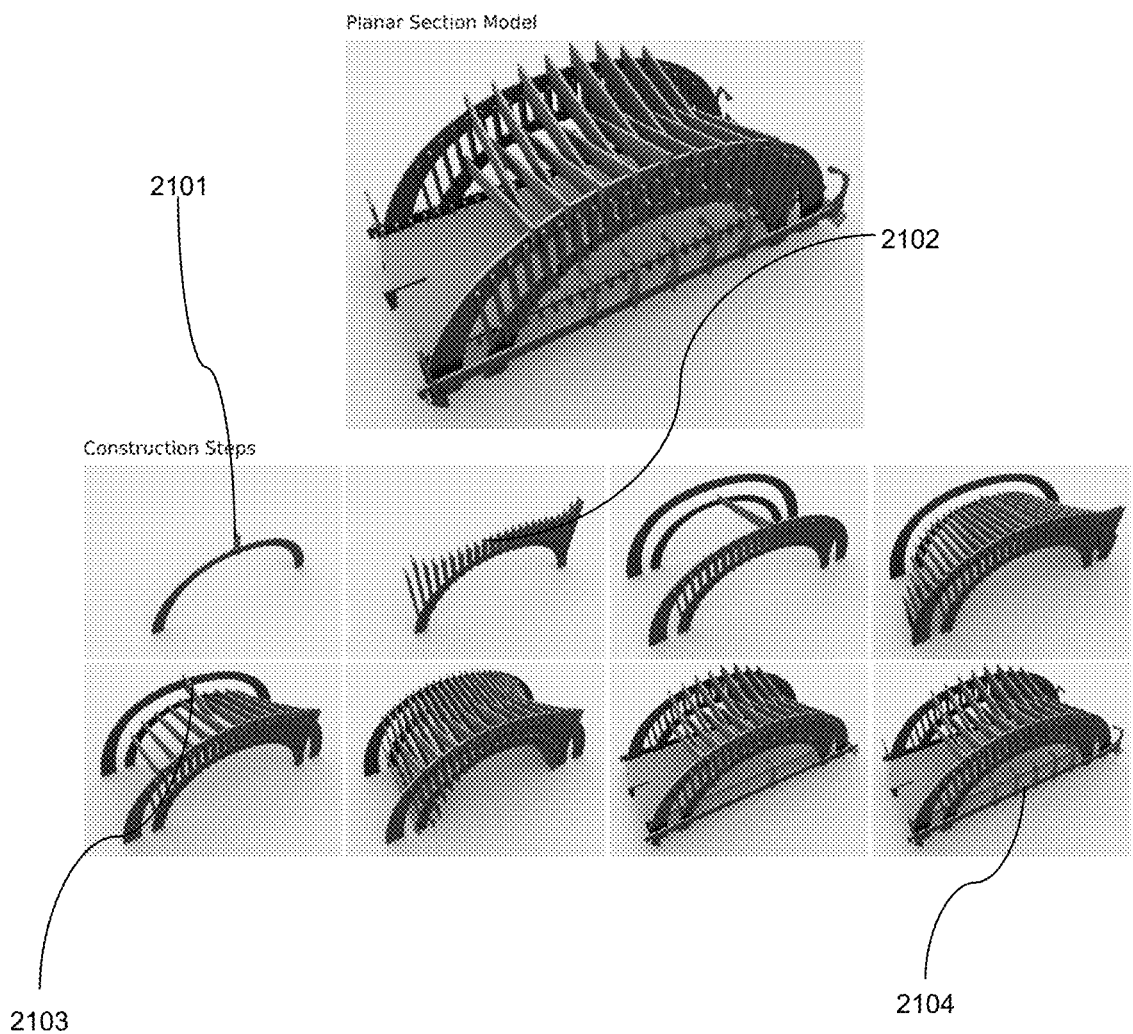
FIG. 21 illustrates exemplary models generated using the system.

Referring now to FIG. 21, an exemplary model of a planar section representation of a bridge created using linear operations is shown. The steps required in the construction, which show the numerous linear operations required: one to connect coplanar arches 2101, two to connect lower to upper arches across the bridge 2102, one to create lampposts along the bridge 2103, and one to create a barrier at the sides of the road 2104. For these linear operations, duplicated planar section contours are only scaled vertically, along the intersection axis.

The generating unit may also duplicate sections around a root section by rotating the sections using the tangent direction along the root. To keep the orientation of copies consistent for the duplicates, the relative angle $\Theta$ between the duplicate's normal and root's boundary tangent is applied to all duplicates.

Figure 22:
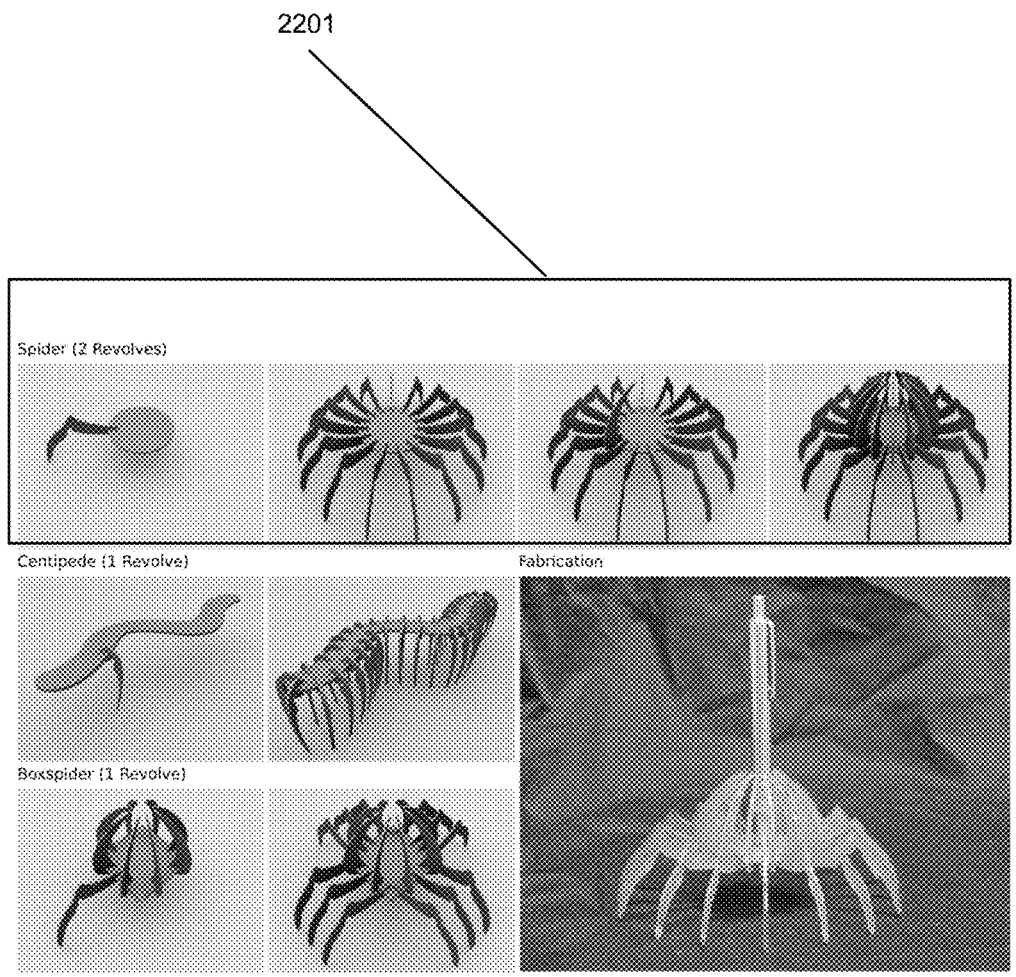
FIG. 22 illustrates exemplary models generated using the system.

Referring now to FIG. 22, a number of model insect-like examples are shown and are created by rotating sections using the tangent direction along the root. For example, a spider may be created by performing 1 revolve operation for legs as well as one revolve operation to create the body of the spider 2201.

Figure 23:
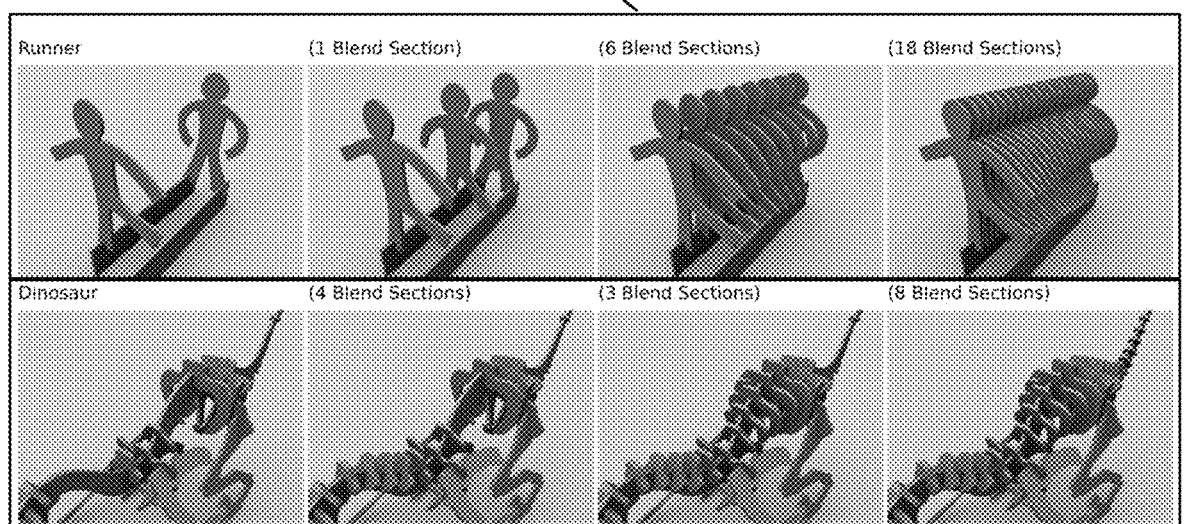
FIG. 23 illustrates exemplary models generated using the system.

The system may also enable the user to perform a blend operation which allows the user to create blended copies of two planar sections $P_2$ and $P_3$, along a third base planar section $P_1$. The details of this operation are composed of two parts: first, the blending of each 2D planar section boundary; second, the 3D placement of each blended planar section. Examples using the blend operation are shown in FIG. 23.

To first create the blended 2D boundary curve, a point-to-point correspondence between the control points of the two boundary curves of $P_2$ and $P_3$ is formed ($P_2$ and $P_3$ are each assumed to have only one boundary curve). If the boundary curves of $P_2$ and $P_3$ do not have the same number of control points, the boundary curve with fewer points is subdivided into two halves at its longest segment. This process, of computing the longest segment and dividing into two, is repeated until the two curves have an equal number of control points. Then, to find the correspondence, the sum of ordered 2D distances between points of the curves are computed, trying each point offset and both forward and backward directions.

In an example, $\{p_0, \ldots, p_{n-1}\}$ and $\{q_0, \ldots, q_{n-1}\}$ is the equally-sized sets of 2D boundary curve points of $P_2$ and $P_3$, the visualization device computes an offset i that minimizes the sum of pairwise distances:

$$min_{i \in \{0, \ldots, n-1\}} \Sigma_{j=0}^{n-1} \|p_{index(j+1)} - q_{index(j)}\|_2 \tag{6}$$

where index(i)=in. (Note that the set of boundary curve points of $P_3$ is also reversed, to test for an ordered correspondence in both directions.) The optimal correspondence is defined by an integer value for the offset and a Boolean value for the direction.

The intersection of $P_2$ and $P_3$ with $P_1$ define two points along a boundary curve of $P_1$ (we assume $P_2$ and $P_3$ each intersect one common boundary curve of $P_1$ at one point, or else the operation does not take place). Since $P_1$'s boundary is a closed curve, there are two paths one could travel from $P_2$'s intersection to $P_3$'s intersection. It is assumed that when blending two sections $P_2$ and $P_3$, the shortest path (arc-length along $P_1$'s boundary) may be selected. The shortest 3D curve segment of $P_1$'s boundary connecting $P_2$ to $P_3$ to position the blended sections is used. The tangents and normals along the curve are used to define a coordinate frame for each blended planar section. Recall that since a cubic Bézier spline defines the boundary curve, the coordinate frames will be vary smoothly, except where a tangential discontinuity is explicitly defined by the user at a control point. Since $P_2$ and $P_3$ may not have a normal parallel to the tangent of $P_1$ where they intersect the boundary, the two rotation offsets $\Theta_2$ and $\Theta_3$ are first computed, and blended coordinate frames are additionally rotated about $P_1$'s normal by an angle linearly interpolated between $\Theta_2$ and $\Theta_3$.

Referring now to FIG. 23, two example model planar sections show a figure in different poses. The blend operation may enable a model such as this example to be designed quickly and with appropriately spaced components. Intermediate sections are created using the blend operation, here 1, 6 and 18 are shown as blended sections 2301. The blend operation is then applied three times to create vertebrae and ribs along intervals of the spine of a dinosaur 2302.

The maximum dimensions of each planar section may be restricted due to the size of materials used for fabrication. A laser cutter for instance is constrained to make sections only as large as the sheets of material or the rectangular bed the material rests in. The user interface may provide the user with the option to perform grid procedural modelling operation, which divides large sections into a collection of smaller sections that assemble, to address the size restriction of materials.

Figure 24:
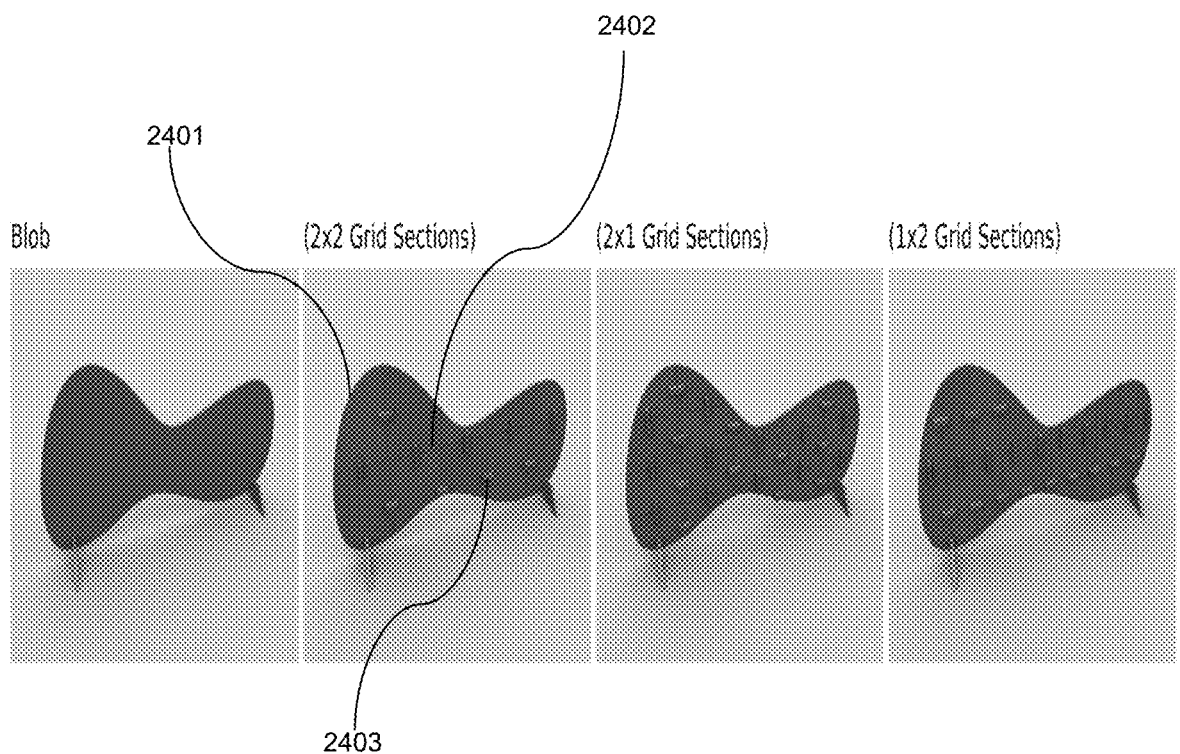
FIG. 24 illustrates exemplary models generated using the system.

The operation may be parameterized by the maximum width and height of each grid section, as well as the size of square-shaped sections used to connect the grid sections together along the midpoint of adjacent edges. Referring now to FIG. 24 an exemplary model planar section split into sections in a grid pattern 2402 is shown. Sections to connect adjacent grid sections may be automatically generated along edge midpoints 2403. The shape used in order to create the grid may be configured by the user.

The user interface may also enable the user to perform a radial operation. The generating unit modifies the shape of a selected planar section radially, allowing users to control the distance to a center point to make circles, stars, holes, and other shape options. The operations are parameterized by point and tangent control point distances from the center of the section, as well as the number of times the pattern may repeat, for example to create various gear shapes with varying holes and teeth in as shown in FIG. 25.

Figure 25:
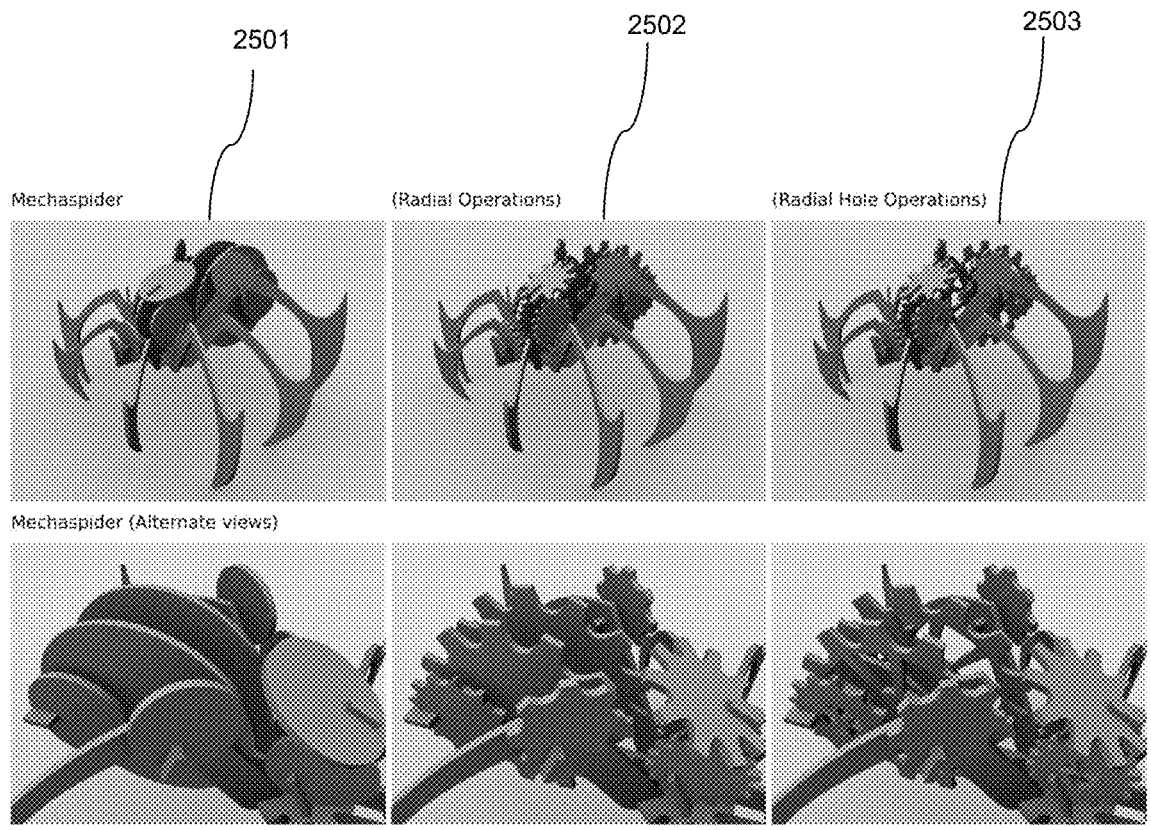
FIG. 25 illustrates exemplary models generated using the system.

Referring now to FIG. 25, an example of a spider model composed of some disc-shaped sections 2501 is shown. The radial operation may be applied to create gears on the model 2502. The radial hole operation may be used to cut holes into some of the gears 2503.

Figure 26:
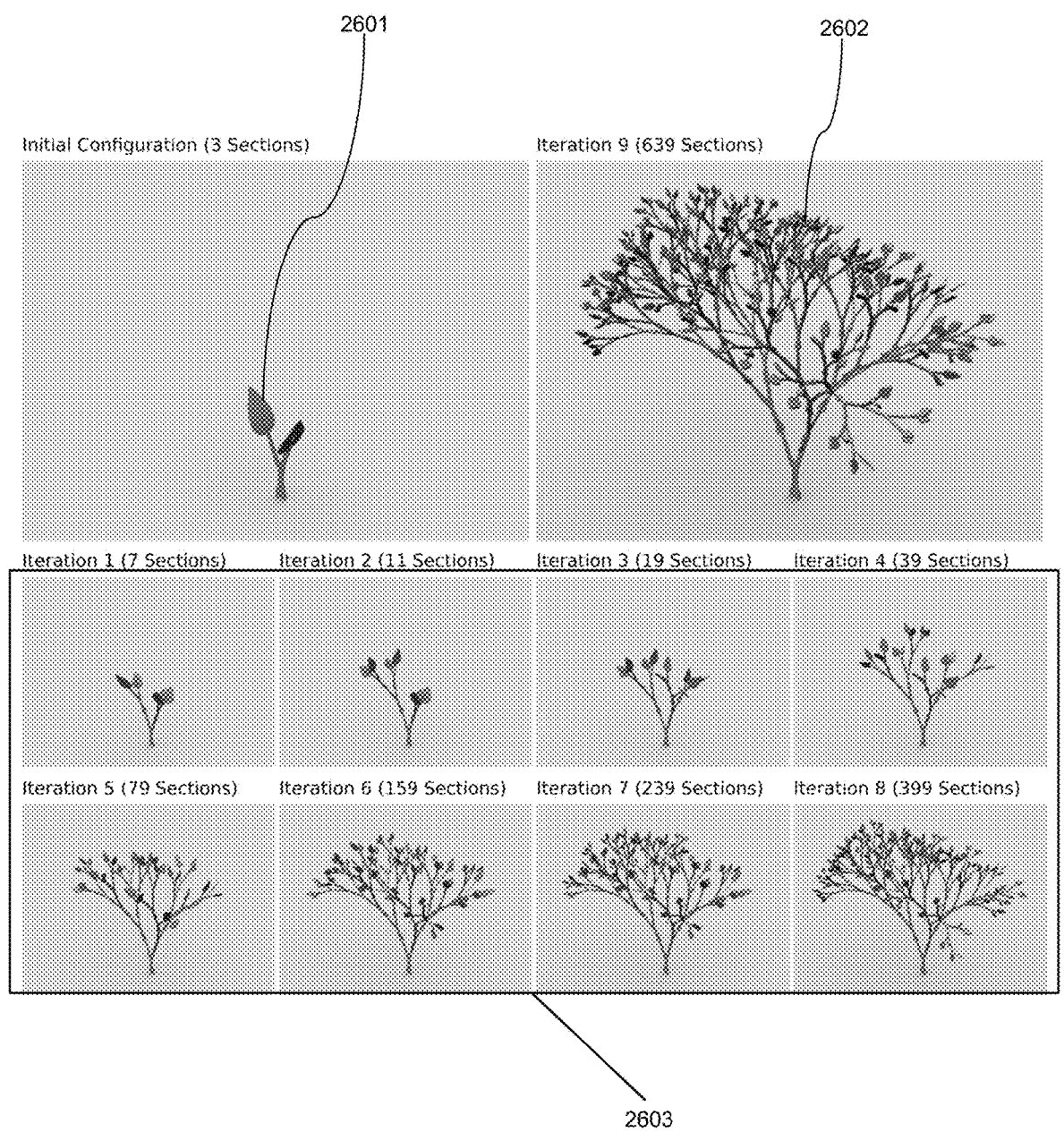
FIG. 26 illustrates exemplary models generated using the system.

The user interface may also enable the user to select an automatic branching operation. Taking n connected planar sections (n≥2) as a starting point, one of the planar sections is identified as the root within a hierarchy (a tree) as shown in FIG. 26. The root planar section intersects k child planar sections, which are the roots of their own sub-trees. Recall that each child planar section interlocks with the root using a defined slit at the intersection. The branching operation replaces each of the k existing sub-trees with the current entire tree of n planar sections.

Referring now to FIG. 26, the parent planar section (a branch in the shape of a "Y") and its two children (shaped as leaves) 2601 are all the required input for the procedural modelling approach, which produces a planar section representation of a tree 2601 after 9 iterations 2602. The progression of the tree representation 2603 may be visualized after each iteration 2603.

Note that the planar sections, and the definition of slits that define how to spatially interconnect them, are needed for the branching operation to take place. However, one additional slit that describes how the root section (and thus the entire tree) connects is required when it is copied to replace each of the k sub-trees. The root slit may be interactively specified by the user.

Applying the operation iteratively, the representation becomes progressively more complex. After each iteration, the resulting tree will have nk+1 planar sections (without modifications). To represent more natural-looking objects, modifications may be made such as reducing scale of child planar sections after each iteration.

The outcome of the operation may be randomized—for instance to copy over only some of the existing k sub-trees, at random. Planar section representations created using an operation with both of these modifications is demonstrated in FIG. 26, where fabricable, natural-looking tree representations may be created from minimal user input.

In another aspect, the system may perform physical simulation to provide visual feedback and suggestions to the user revealing the location of structural weaknesses. The feedback makes physically weak designs obvious, and the user may fix these weaknesses interactively during the shape modelling session. The user may model intended use or function of the model by interactively adding weights, which apply additional external forces within the simulation.

The generating unit provides two functions for physical simulation. The first is inter-plate analysis, and the second is within-plate analysis. For the inter-plate analysis, the plates are assumed to be undeformable and unbreakable rigid bodies, and compute the forces on the joints and contact points. For the within-plate analysis, the stress for each individual plate is computed using the forces computed in the inter-plate analysis. This approach allows for one to sample arbitrary cross-sections for a plate. The plate is uniformly sampled using cross-sections along four unique directions within the plate.

The generating unit presents cross-section indications, for example colors may be used to transition linearly through hues of different colors until the maximum stress the material may handle is reached and sections are identified to the user. A safety factor may be enforced when no cross-sections are displayed. The user is free to interactively vary three required physical measurements: the maximum stress of the material (specified in megapascals), the density of the material (specified in kilograms per cubic metre), and the material thickness (specified in metres).

The system may be used to verify that a model is structurally strong enough to handle weight to be borne depending on the functional model or eventual item. Values for the material thickness, stress and density, as well as the masses that apply external force—meant to simulate the downward force of hanging cutlery—may be inputs provided to the system. The generating unit reveals cross-sections of planar sections where the stress is too great and where model is likely to fracture. Cross-sections where the model is likely to break may be rendered in a given color.

The system may color cross-sections using a range of hues to warn the user of potential fracture regions. Stress along the cross section that may be handled may be indicated to the user. Indicators other than colors may be employed to identify weight handling, thickness, stress, density and/or masses that apply external force.

Figure 27:
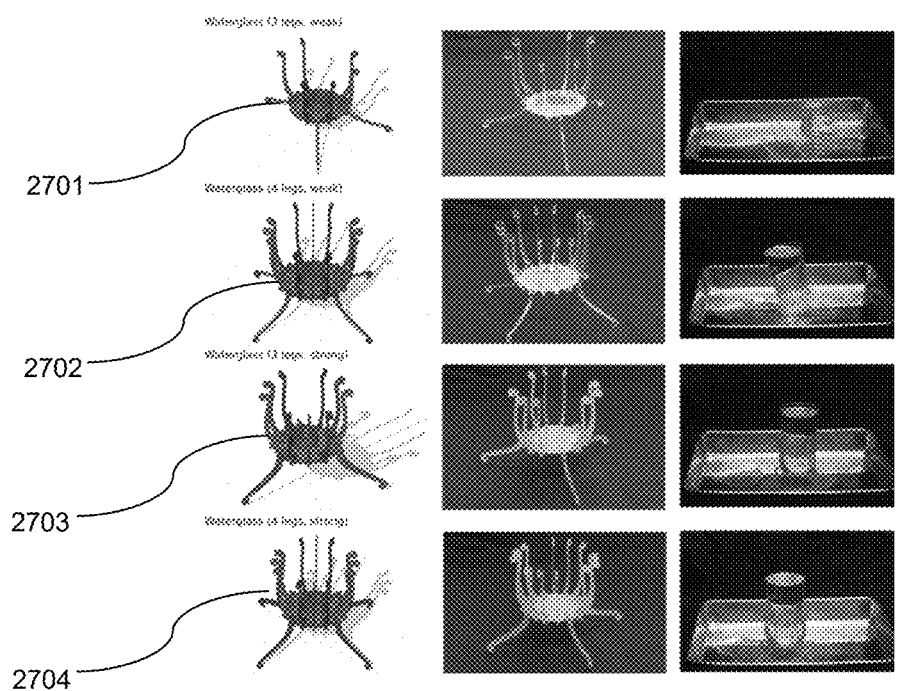
FIG. 27 illustrates exemplary models generated using the system.

As shown in FIG. 27, four variations of an exemplary object intended to hold a glass of water created by the system are shown. The first variation 2701 has three thin legs, which fracture well before a glass may be filled. A variation with 4 thin legs also fractures under the weight of a glass of water but shows improvement 2702. A stronger variation with three thicker legs is able to withstand the weight of a full glass of water, but the system warns of a potential fracture where the legs and central disc meet 2703. An even stronger 4 leg design also handles the weight of a glass of water, and the system reduces the warning of potential fracture where legs and central disc meet 2704. The generating unit may provide visual warning to the user of the likelihood of breakage following fabrication.

In further embodiments, a particular material can be pre-simulated for stress from all possible directions for sections of varying thickness. Data comprising computed stresses for varying material thickness may be collected and provided as pre-configured data to the system and stored in the database. The local thickness of a generated section may then be computed in real-time while the user is interacting with the system, and the weakness of thin parts may be visually indicated using the user interface. Visual indication may be made by color coding, flashing, or otherwise visually distinguishing weak areas.

In another aspect, a system and method for generating planar section representations suitable for fabrication is provided. Representations may be exported in the SVG format, which may be used to drive a laser cutter. Considerations for creating and exporting fabricable models with the system are detailed below. The following feasibility tests, are performed by the system and suggestions for model improvements are presented to the user as computed by the generating unit.

The generating unit may provide various operations including identifying the centre of mass, parallel intersection lines, connectedness and the ideal location for slits to be utilized during assembly of the model where the user either imports or creates a planar surface. In further embodiments, near planar 3D shapes may be approximated to be assembled using corrugations or other connectors.

Figure 28:
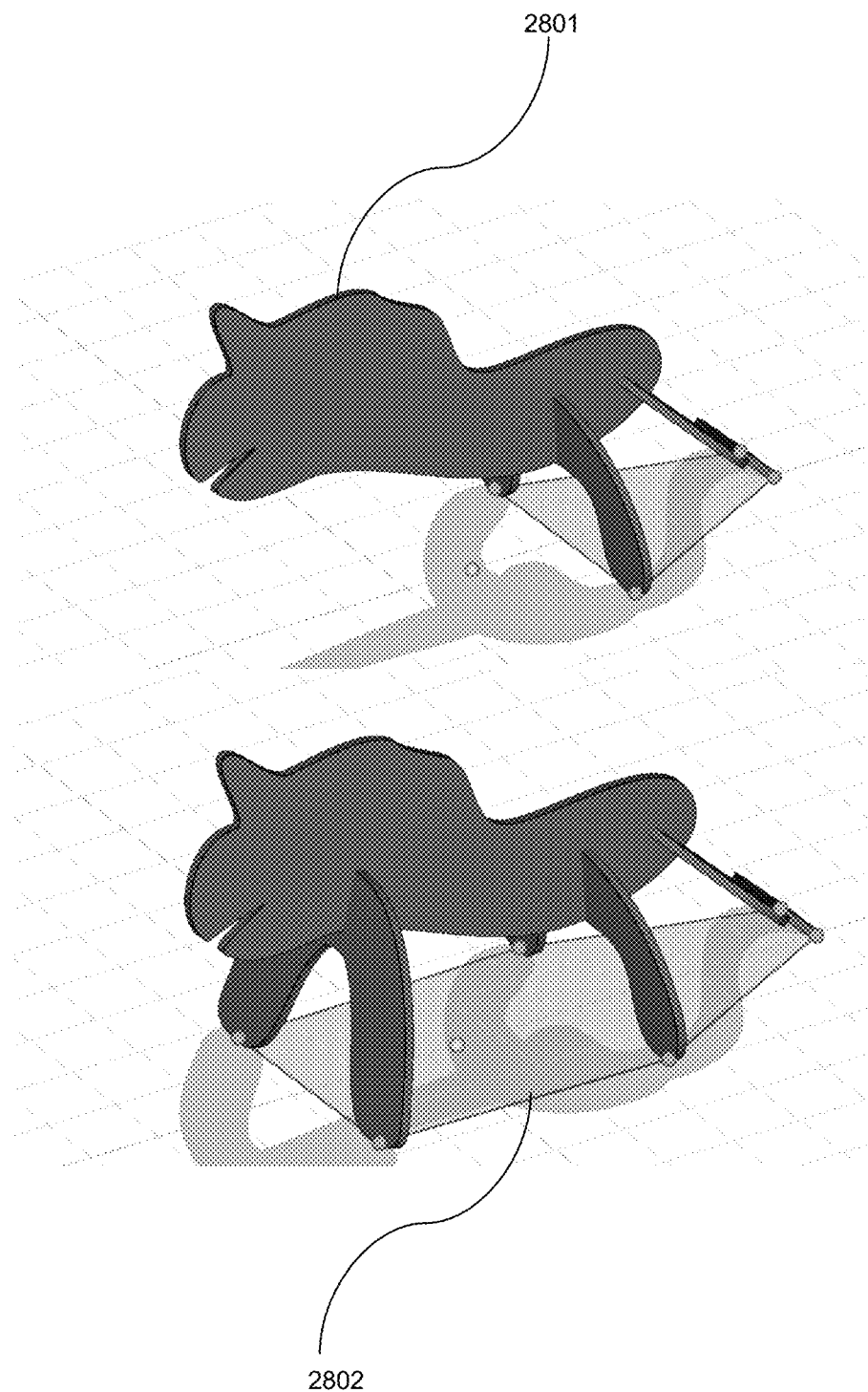
FIG. 28 illustrates exemplary models generated using the system.
Figure 29:
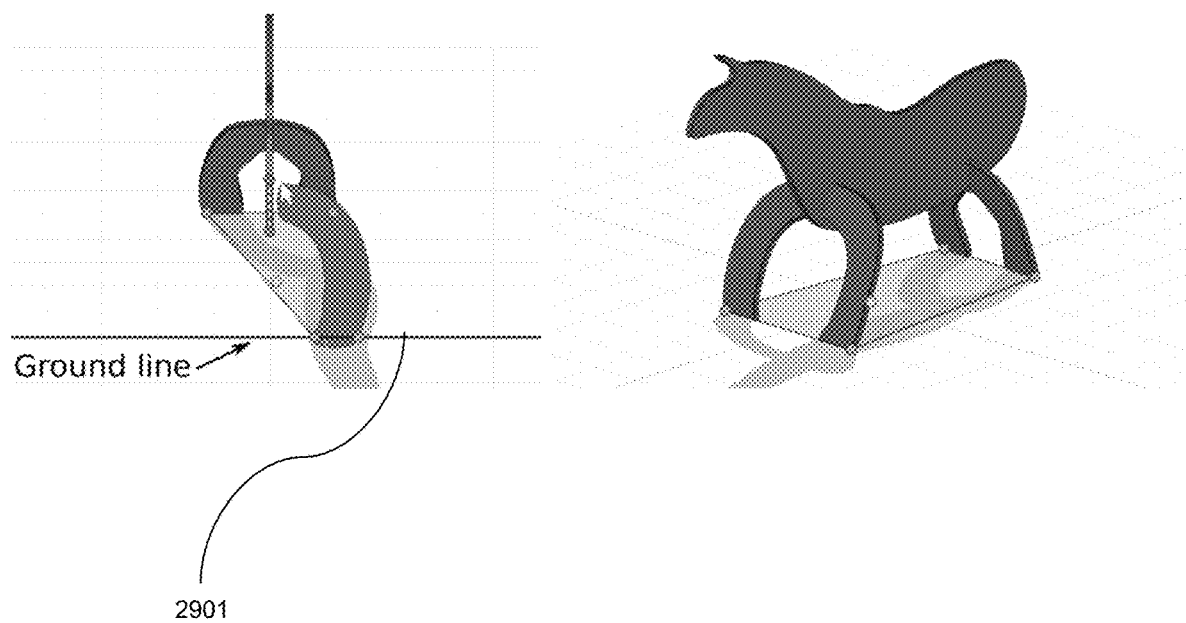
FIG. 29 illustrates exemplary models generated using the system.

The generating unit may compute the centre of mass of the model and the convex hull of any contact points with the ground plane. If the projected centre of mass falls within the convex hull, the model is geometrically stable—it does not "fall over" when placed on a flat surface. The generating unit may show the user the convex hull of the extremal contact points and the centre of mass on the ground plane. Referring now to FIG. 28 an example of a model that will fall since the centre of mass does not fall within the contact region is shown 2801. The user may add new ground contact points resulting in a geometrically stable model 2802.

Following any interaction to create new planar sections or modify the section contour, the generating unit automatically translates the control points of the Bézier spline representing the contour so that planar sections do not pass through the ground plane. This ensures that once the model is manufactured it will have co-planar contact points. When the planar section contour is being created, the generating unit may identify the intersection of the current canvas plane with the ground plane. For example, and as shown in FIG.

29, a thick black line is used to identify this intersection 2901. This eases the process of ensuring that there are suitable contact points on the ground plane.

Figure 30:
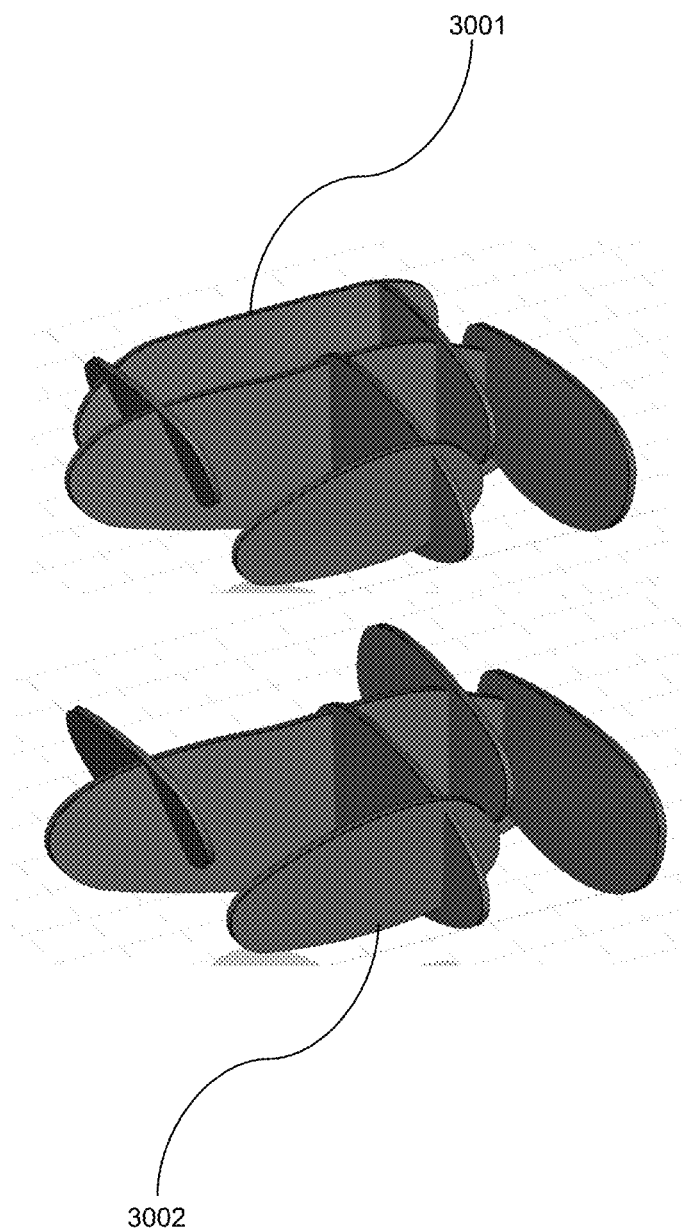
FIG. 30 illustrates exemplary models generated using the system.
Figure 31:
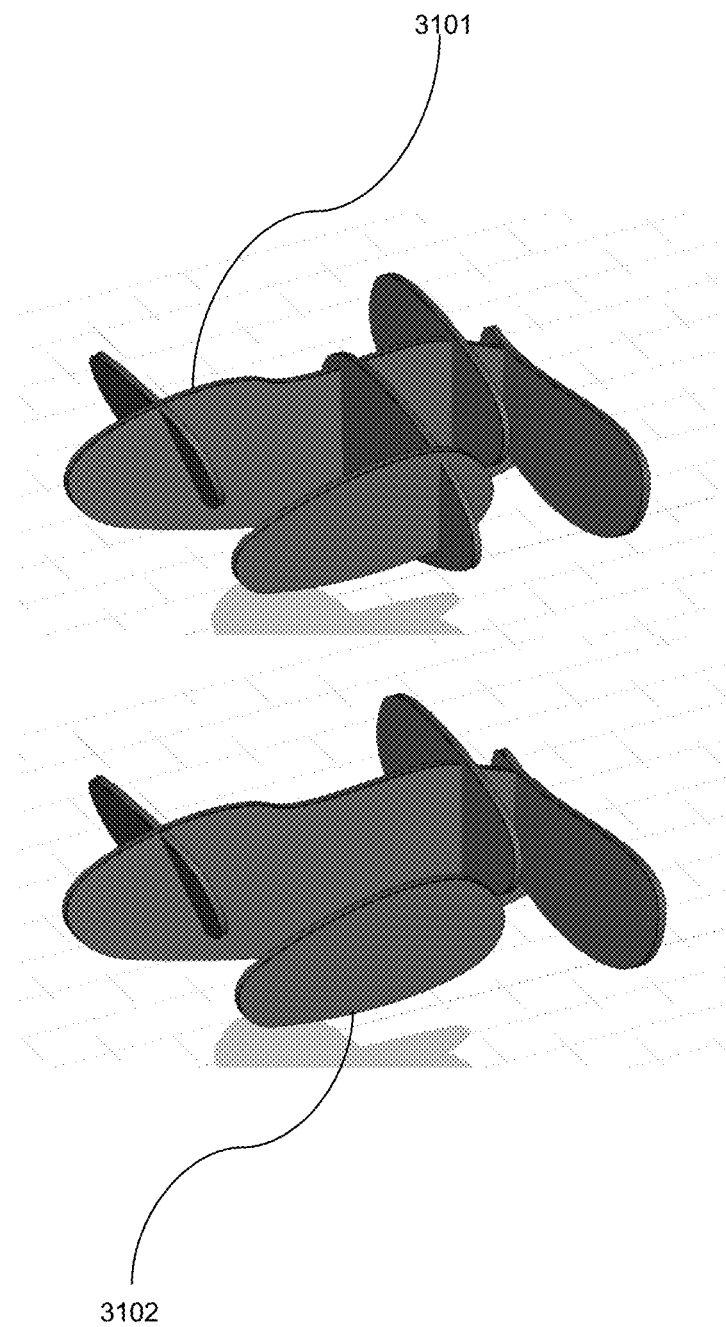
FIG. 31 illustrates exemplary models generated using the system.

Planar sections that form cycles with non-parallel intersections make physical assembly impossible. Two parallel slits are required since they divide the cycle into two parts, and these parts will slide in opposite directions along the parallel slit axis to separate the cycle. The generating unit may detect and reveal cycles, allowing the user to resolve the problem. Referring now to FIG. 30, a model shape representation is shown. In this example, a cycle of planar sections with non-parallel intersections 3001 cannot be physically assembled. The user may delete a planar section to break the cycle, fixing the problem 3002.

In further embodiments, cycles may be broken by defining the interlocking slit entirely on one section, so that the other section may be freely slid into the slit as far as needed, with a snug fit resulting from friction between the pieces. The user interface may comprise configuration commands enabled by, for example, sliders, that enable the user to define the proportions of a shared pair of slits to be placed on a first section and an interlocking second section. Thus, slits may be defined as, for example. 50:50, 70:30, 30:70, 100:0, 0:100 or any other suitable combination. In particular cases of 0:100 and 100:0 and other similar slit proportions, the sections may be further affixed with friction fit to maintain the intended design.

In other aspects, the slits may be defined as prototyping slits and can be removed at the time of fabrication by setting the slits to 0:0. In this case, planes may be affixed to one another by commodity connectors, such as screws, hinges, dowels, adhesives, or fuse connectors.

Planar sections that "float in space" cannot exist in the physical world, therefore connectedness may be tested and corrected. This may be caused either by removal or modification of existing planar sections or removed throughout the modelling process, this may influence the connectivity of other planar sections in the model. It is possible that the user may assume that two planar sections intersect, when they actually do not. Finally, because of the dead zone, it is possible when creating a new planar section to sketch a contour that does not intersect any other planar sections, leading to an unconnected planar section being formed.

The generating unit treats planar sections as vertices in a graph, and edges are defined by their intersections. The generating unit computes a path in the graph to each other planar section.

Figure 4:
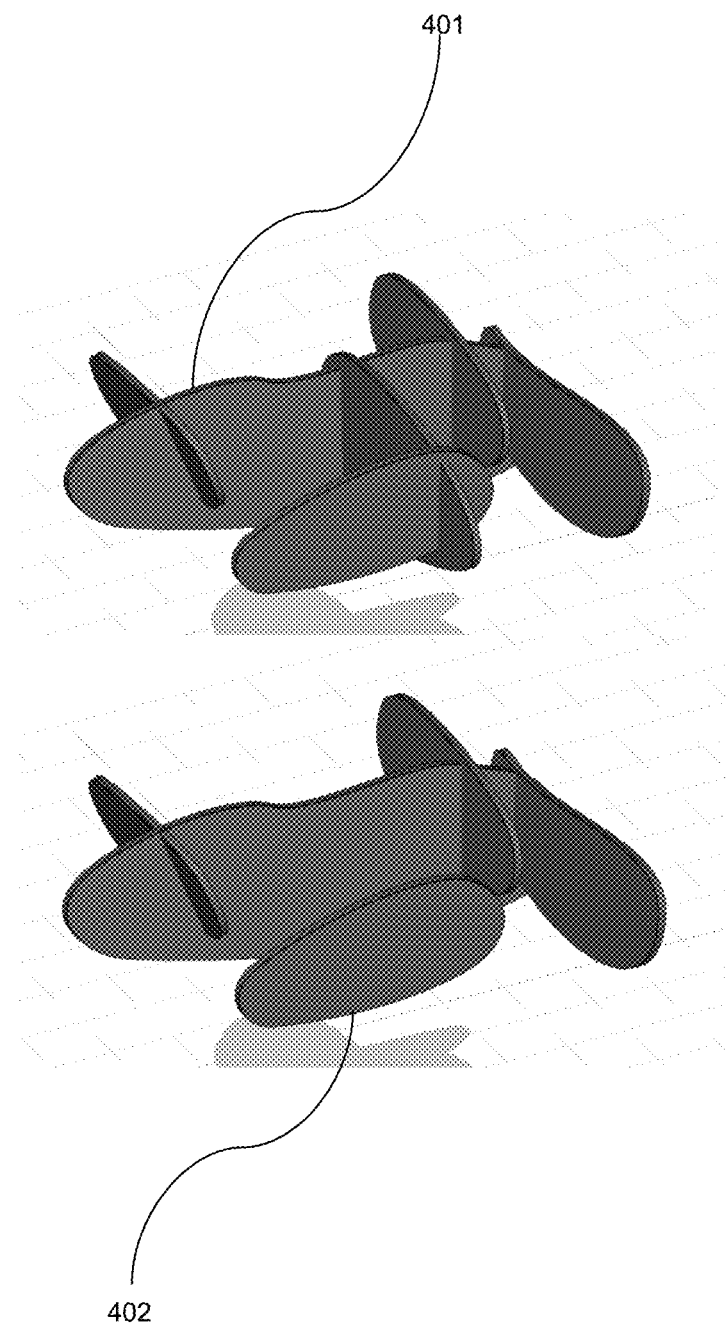
FIG. 4 illustrates exemplary models generated using the system.

Referring now to FIG. 4, an exemplary shape representation is shown. In this example, the model 401 is a series of connected plates. The deletion of a planar section 402 causes another to lose its connection to the rest of the model. For those planar sections where a path cannot be found, these sections are not connected ("floating") and are identified to bring them to the user's attention. During any interaction involving the editing of any planar section, the system computes and reveals unconnected planar sections as shown in FIG. 4.

The slits to cut into each planar section may be automatically computed by the generating unit. For a given pair of planar sections, the axis of intersection of the planes is calculated. Then, the points on the planar section contours that intersect the axis are computed and sorted in order along the axis. When two adjacent contour points with index k and k+1 along the intersection axis belong to different planar sections, an intersection condition is detected and slit rectangles are made between points $p_{k+1}$ and $p_{k+2}$. To locally approximate how the two planar sections slide together, The distances $d_1 = \|p_k - p_{k+1}\|_2$, and $d_2 = \|p_{k+2} - p_{k+3}\|_2$ are computed and compared by the generating unit. Depending on the direction, one slit endpoint will be defined by the midpoint between $p_{k+1}$ and $p_{k+2}$, and the other endpoint will be either $p_{k+1}$ or $p_{k+2}$.

Figure 3:
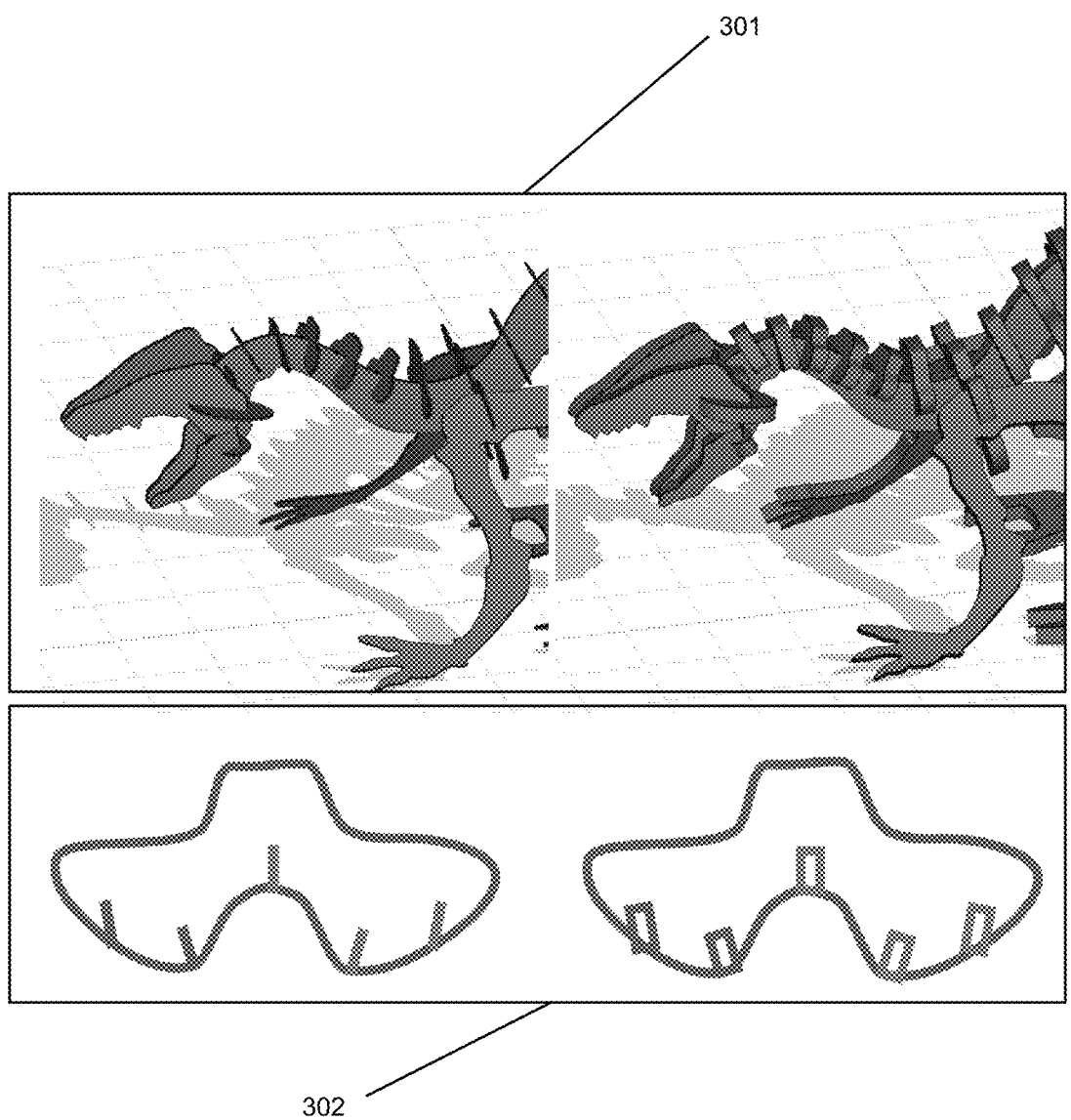
FIG. 3 illustrates exemplary models generated using the system.

Referring now to FIG. 3 an example of adjusting planar section thickness within the system is shown. The user interface is shown displaying a model of a dinosaur 301. A vectorized 2D output 302 for fabricating a planar section is generated by the generating unit; the curves define where to cut the material. The thickness value may be set to match the material thickness, since it defines slit width.

The slits may be shaped as rectangles that follow the intersection axis, with a width equal to the thickness of the planar sections as they are shown during interaction. The planar section thickness may be adjusted interactively and automatically.

Planar section contours may be assigned specific colours, gradients, or any other indicating visualization when written to the file. For example, slit colours may match the colour of the joining planar section, for correspondence. Fabrication output may thus be used as a guide for assembly. Alternatively, interlocking pairs of slits can be numbered/enumerated, and these instructions can be etched directly onto each fabricated planar section by some devices. Additionally, sections may be assembled using other commodity connectors, such as screws, hinges, dowels, etc., that may be included on the guide for assembly. The system can also support visualization of the assembly process, showing step-by-step which sections to connect in a particular order to assembly is possible.

In further embodiments, planar sections may be texture mapped using imported images, projections from a 3D textured surface that is sliced, or based on the texture within a 3D column that is sliced. In this way, the planar sections may actually be represented by substantially planar, or not quite planar sections. Examples could be sections that are substantially planar but comprise a plurality of cut outs disposed through the planes. These are considered "planar" in the present application.

Although the following has been described with reference to certain specific embodiments, various modifications thereto will be apparent to those skilled in the art without departing from the spirit and scope of the invention as outlined in the appended claims. The entire disclosures of all references recited above are incorporated herein by reference.

What is claimed is:

1. A system for generating one or more planar sections to represent a three dimensional model using a fluid stroke-based workflow, the system comprising one or more processors and a computer-readable memory, the computer readable memory having computer readable instructions stored thereon, which when executed by the processor are configured to provide:

a user interface unit configured to receive user input from an input device and display information on a display device; and a generating unit in communication with the user interface unit, the generating unit generating:

a first planar section positioned along a first plane; and a second planar section positioned along a second plane after receiving a first user input and a second user input via the user interface unit, the first user input comprising a continuous stroke defining a slit along at least a portion of the first planar section, the second user input having a start point and end point each on the continuous stroke defining the slit and the second user input defining an outer contour of the second planar section, the second planar section orthogonal to the first plane and intersecting the first planar section along the continuous stroke;

wherein the user interface unit displays the first planar section and the second planar section received from the generating unit on the display device.

2. The system of claim 1, wherein the display device automatically rotates the display to a frontoparallel viewpoint after the first user input is received.

3. The system of claim 1, wherein, after receiving the second user input, the generating unit generates a corresponding outer contour for the second planar section symmetrically about the continuous stroke defining the slit to the outer contour received as part of the second user input.

4. The system of claim 1, wherein the generating unit further generates subsequent planar sections along respective subsequent planes by, for each subsequent planar section:

after receiving a subsequent first user input and a subsequent second user input via the user interface unit, the subsequent first user input comprising a subsequent continuous stroke defining a slit along at least a portion of the last generated planar section, the subsequent second user input having a start point and end point each on the subsequent continuous stroke defining the slit and the subsequent second user input defining an outer contour of the subsequent planar section, the subsequent planar section orthogonal to the last generated planar section and intersecting the last generated planar section along the subsequent continuous stroke.

5. The system of claim 4, wherein the display device, upon generating the subsequent planar section, automatically rotates the view with respect to the display device such that the subsequent planar section is displayed as frontoparallel with the display device.

6. The system of claim 1, wherein the system further generates a dead zone around the continuous stroke defining the slit, the user interface unit configured to the first user input within the dead zone to determine the contour of the second planar section.

7. A computer-implemented method for generating one or more planar sections to represent a three dimensional model using a fluid stroke-based workflow, the method comprising:

displaying a first planar section positioned along a first plane;

receiving a first user input comprising a continuous stroke defining a slit along at least a portion of the first planar section;

receiving a second user input having a start point and end point each on the continuous stroke defining the slit, generating a second planar section positioned along a second plane and having an outer contour defined by the second user input, the second planar section orthogonal to the first plane and intersecting the first planar section along the continuous stroke; and displaying the second planar section.

8. The method of claim 7, further comprising rotating display of the first planar section to a frontoparallel viewpoint after the first user input is received.

9. The method of claim 7, further comprising, after receiving the second user input, generating a corresponding outer contour for the second planar section symmetrically about the continuous stroke defining the slit to the outer contour received as part of the second user input.

10. The method of claim 7, further comprising generating subsequent planar sections along respective subsequent planes by, for each subsequent planar section:

after receiving a subsequent first user input and a subsequent second user input, the subsequent first user input comprising a subsequent continuous stroke defining a slit along at least a portion of the last generated planar section, the subsequent second user input having a start point and end point each on the subsequent continuous stroke defining the slit and the subsequent second user input defining an outer contour of the subsequent planar section, the subsequent planar section orthogonal to the last generated planar section and intersecting the last generated planar section along the subsequent continuous stroke.

11. The method of claim 10, further comprising, upon generating the subsequent planar section, automatically rotating the display such that the subsequent planar section is displayed as frontoparallel.

12. The method of claim 7, further comprising generating a dead zone around the continuous stroke defining the slit to receive the first user input within the dead zone to determine the contour of the second planar section.

* * * * *